(12) United States Patent
Chen

(10) Patent No.: US 12,510,737 B2
(45) Date of Patent: *Dec. 30, 2025

(54) OPTICAL LENS ASSEMBLY, IMAGE CAPTURING APPARATUS AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 848 days.

This patent is subject to a terminal disclaimer.

(21) Appl. No.: 17/837,221

(22) Filed: Jun. 10, 2022

(65) Prior Publication Data

US 2022/0299740 A1    Sep. 22, 2022

Related U.S. Application Data

(63) Continuation of application No. 17/001,901, filed on Aug. 25, 2020, now Pat. No. 11,391,927, which is a (Continued)

(30) Foreign Application Priority Data

Apr. 16, 2015    (TW) .................................. 104112263

(51) Int. Cl.
*G02B 13/00*    (2006.01)
*G02B 3/04*    (2006.01)
(Continued)

(52) U.S. Cl.
CPC ........... *G02B 13/0045* (2013.01); *G02B 3/04* (2013.01); *G02B 9/62* (2013.01); *G02B 9/64* (2013.01); *G02B 13/18* (2013.01)

(58) Field of Classification Search
CPC ... G02B 3/04; G02B 9/62; G02B 9/64; G02B 13/0045; G02B 13/18
(Continued)

(56) References Cited

U.S. PATENT DOCUMENTS 4,963,007 A    10/1990    Moskovich
7,633,688 B2    12/2009    Kamo
(Continued)

FOREIGN PATENT DOCUMENTS

CN    204065534 U    12/2014
CN    204065539 U    12/2014
(Continued)

*Primary Examiner* — Nicholas R. Pasko
(74) *Attorney, Agent, or Firm* — McClure, Qualey & Rodack, LLP

(57) ABSTRACT

An optical lens assembly includes, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element has refractive power. The third lens element has refractive power. The fourth lens element has refractive power. The fifth lens element with refractive power has an image-side surface being concave in a paraxial region thereof. The sixth lens element with refractive power has an object-side surface being concave in a paraxial region thereof. The seventh lens element with refractive power has an image-side surface being concave in a paraxial region thereof.

21 Claims, 17 Drawing Sheets

Related U.S. Application Data continuation of application No. 16/596,900, filed on Oct. 9, 2019, now Pat. No. 10,788,650, which is a continuation of application No. 16/161,403, filed on Oct. 16, 2018, now Pat. No. 10,481,368, which is a continuation of application No. 15/582,843, filed on May 1, 2017, now Pat. No. 10,133,033, which is a continuation of application No. 14/788,046, filed on Jun. 30, 2015, now Pat. No. 9,671,591.

(51) Int. Cl.
*G02B 9/62* (2006.01)
*G02B 9/64* (2006.01)
*G02B 13/18* (2006.01)

(58) Field of Classification Search
USPC .................................................. 359/708–718
See application file for complete search history.

(56) References Cited

U.S. PATENT DOCUMENTS

| | | | |
|---|---|---|---|
| 8,599,495 B1 | 12/2013 | Tsai et al. | |
| 8,736,979 B2 | 5/2014 | Tsai et al. | |
| 8,780,464 B2 | 7/2014 | Huang | |
| 9,091,843 B1 | 7/2015 | Hudyma et al. | |
| 9,146,380 B2 | 9/2015 | Kubota et al. | |
| 9,671,591 B2 * | 6/2017 | Chen | G02B 3/04 |
| 10,133,033 B2 * | 11/2018 | Chen | G02B 3/04 |
| 10,481,368 B2 * | 11/2019 | Chen | G02B 3/04 |
| 10,788,650 B2 * | 9/2020 | Chen | G02B 13/18 |
| 2014/0009843 A1 | 1/2014 | Tsai et al. | |
| 2014/0139719 A1 | 5/2014 | Fukaya | |
| 2015/0009578 A1 | 1/2015 | Shinohara et al. | |
| 2015/0103414 A1 | 4/2015 | Baik | |
| 2015/0185441 A1 | 7/2015 | Liao | |
| 2015/0198787 A1 | 7/2015 | Kubota et al. | |
| 2015/0198791 A1 | 7/2015 | Kubota et al. | |
| 2015/0212298 A1 | 7/2015 | Shinohara et al. | |
| 2015/0268448 A1 | 9/2015 | Kubota et al. | |
| 2015/0277083 A1 | 10/2015 | Chae | |
| 2015/0378131 A1 | 12/2015 | Tang et al. | |
| 2016/0085058 A1 | 3/2016 | Chae | |
| 2016/0109687 A1 | 4/2016 | Son | |
| 2016/0124191 A1 | 5/2016 | Hashimoto | |
| 2016/0131874 A1 * | 5/2016 | Tang | G02B 9/64 |
| | | | 359/708 |
| 2016/0139372 A1 | 5/2016 | Tanaka | |
| 2016/0282587 A1 | 9/2016 | Hashimoto | |
| 2016/0299319 A1 | 10/2016 | Tang et al. | |
| 2016/0370560 A1 | 12/2016 | Kubota et al. | |
| 2017/0160519 A1 | 6/2017 | Katsuragi | |
| 2017/0357081 A1 * | 12/2017 | Dai | G02B 9/64 |

FOREIGN PATENT DOCUMENTS

| | | |
|---|---|---|
| JP | H1152239 A | 2/1999 |
| JP | 2005-084387 A | 3/2005 |
| JP | 2006337691 A | 12/2006 |
| JP | 2009-251367 A | 10/2009 |
| JP | 2012-155223 A | 8/2012 |
| JP | 2013-182090 A | 9/2013 |
| JP | 2015-072402 A | 4/2015 |
| JP | 2015-072403 A | 4/2015 |
| JP | 2015-072404 A | 4/2015 |
| JP | 2015-072405 A | 4/2015 |
| JP | 2015-114505 A | 6/2015 |
| TW | 201537208 A | 10/2015 |
| WO | 2014192567 A1 | 12/2014 |
| WO | 2016109938 A1 | 7/2016 |
| WO | 2016110883 A1 | 7/2016 |

* cited by examiner

OPTICAL LENS ASSEMBLY, IMAGE CAPTURING APPARATUS AND ELECTRONIC DEVICE

RELATED APPLICATIONS

The present application is a continuation of the application Ser. No. 17/001,901, filed Aug. 25, 2020, now U.S. Pat. No. 11,391,927, issued on Jul. 19, 2022, which is a continuation of the application Ser. No. 16/596,900, filed Oct. 9, 2019, now U.S. Pat. No. 10,788,650 issued on Sep. 29, 2020, which is a continuation of the application Ser. No. 16/161,403, filed Oct. 16, 2018, now U.S. Pat. No. 10,481,368 issued on Nov. 19, 2019, which is a continuation of the application Ser. No. 15/582,843, filed May 1, 2017, now U.S. Pat. No. 10,133,033 issued on Nov. 20, 2018, which is a continuation of the application Ser. No. 14/788,046, filed Jun. 30, 2015, now U.S. Pat. No. 9,671,591 issued on Jun. 6, 2017, and claims priority to Taiwan application serial number 104112263, filed Apr. 16, 2015, the entire contents of which are hereby incorporated herein by reference.

BACKGROUND

Technical Field

The present disclosure relates to an optical lens assembly and an image capturing apparatus. More particularly, the present disclosure relates to a compact optical lens assembly and an image capturing apparatus which is applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in electronic devices mainly adopts four-element or five-element lens structures. As the popularities of smart phones and portable devices are growing, the optical systems trend to large image area and compact size, and the image capturing apparatus should be also correspondingly compact in size. However, the conventional optical systems cannot satisfy the requirement of both large aperture and short total track length so as difficult to apply to compact electronic devices.

Other conventional compact optical systems with six-element lens structure are also developed. However, the product with large aperture and short total track length usually has poor surface shape so as to cause the problems of curved image, severe distortion and insufficient relative illumination.

SUMMARY

According to one aspect of the present disclosure, an optical lens assembly includes, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element has refractive power. The third lens element has refractive power. The fourth lens element has refractive power. The fifth lens element with refractive power has an image-side surface being concave in a paraxial region thereof. The sixth lens element with refractive power has an object-side surface being concave in a paraxial region thereof, wherein the object-side surface and an image-side surface of the sixth lens element are aspheric. The seventh lens element with refractive power has an image-side surface being concave in a paraxial region thereof, wherein an object-side surface and the image-side surface of the seventh lens element are aspheric, and the image-side surface of the seventh lens element includes at least one convex shape in an off-axial region thereof. The optical lens assembly has a total of seven lens elements with refractive power. There is an air gap between every two of the first lens element, the second lens element, the third lens element, the fourth lens element, the fifth lens element, the sixth lens element and the seventh lens element that are adjacent to each other. When a curvature radius of the object-side surface of the sixth lens element is R11, and a focal length of the optical lens assembly is f, the following condition is satisfied:

$$R11/f<0.$$

According to another aspect of the present disclosure, an image capturing apparatus includes the optical lens assembly according to the aforementioned aspect and an image sensor, wherein the image sensor is disposed on an image surface of the optical lens assembly.

According to another aspect of the present disclosure, an electronic device includes the image capturing apparatus according to the foregoing aspect.

According to another aspect of the present disclosure, an optical lens assembly includes, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element has refractive power. The third lens element has refractive power. The fourth lens element has refractive power. The fifth lens element with refractive power has an image-side surface being concave in a paraxial region thereof. The sixth lens element with refractive power has an image-side surface being convex in a paraxial region thereof. The seventh lens element with refractive power has an image-side surface being concave in a paraxial region thereof, wherein an object-side surface and the image-side surface of the seventh lens element are aspheric, and the image-side surface of the seventh lens element includes at least one convex shape in an off-axial region thereof. The optical lens assembly has a total of seven lens elements with refractive power. There is an air gap between every two of the first lens element, the second lens element, the third lens element, the fourth lens element, the fifth lens element, the sixth lens element and the seventh lens element that are adjacent to each other.

According to another aspect of the present disclosure, an image capturing apparatus includes the optical lens assembly according to the aforementioned aspect and an image sensor, wherein the image sensor is disposed on an image surface of the optical lens assembly.

According to another aspect of the present disclosure, an electronic device includes the image capturing apparatus according to the foregoing aspect.

DETAILED DESCRIPTION

Figure 1:
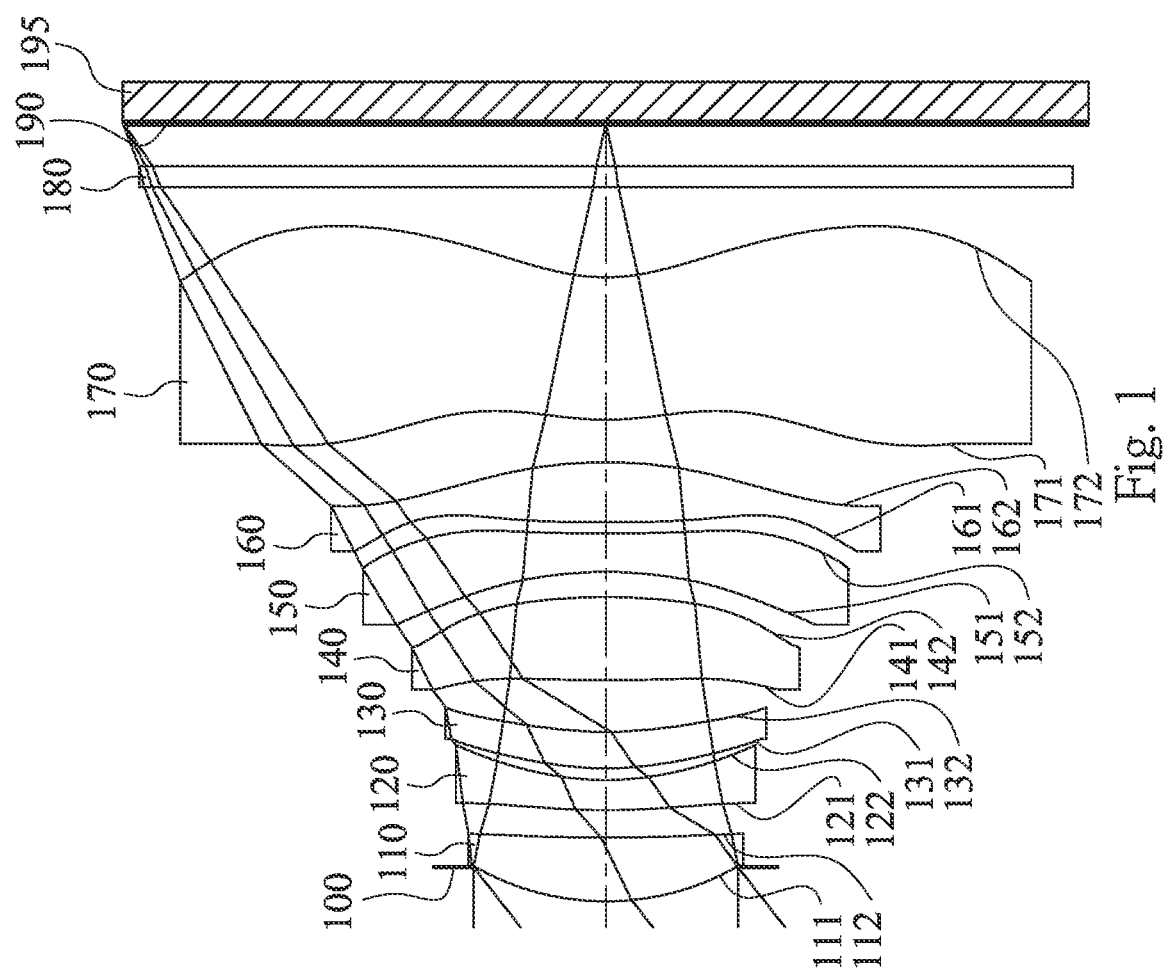
FIG. 1 is a schematic view of an image capturing apparatus according to the 1st embodiment of the present disclosure.

An optical lens assembly includes, in order from an object side to an image side, a first lens element, a second lens element, a third lens element, a fourth lens element, a fifth lens element, a sixth lens element and a seventh lens element. The optical lens assembly has a total of seven lens elements with refractive power.

According to the optical lens assembly of the present disclosure, there is an air gap between every two of the first lens element, the second lens element, the third lens element, the fourth lens element, the fifth lens element, the sixth lens element and the seventh lens element that are adjacent to each other, that is, each of the first through seventh lens elements of the optical lens assembly is a single and non-cemented lens element. Moreover, the manufacturing process of the cemented lenses is more complex than the non-cemented lenses. In particular, cemented surfaces of lens elements need to have accurate curvature to ensure two lens elements will be highly cemented. However, during the cementing process, those two lens elements might not be highly cemented due to displacement and it is thereby not favorable for the image quality of the optical lens assembly. Therefore, there is an air gap between every two of the first lens element, the second lens element, the third lens element, the fourth lens element, the fifth lens element, the sixth lens element and the seventh lens element that are adjacent to each other in the present disclosure for resolving the problem generated by the cemented lens elements.

The first lens element with positive refractive power has an object-side surface being convex in a paraxial region thereof. Therefore, it is favorable for properly adjusting the positive refractive power so as to reduce the total track length of the optical lens assembly.

The third lens element can have an image-side surface being concave in a paraxial region thereof, and the image-side surface of the third lens element can include at least one convex shape in an off-axial region thereof. Therefore, it is favorable for effectively correcting the off-axial aberration.

The fourth lens element can have an object-side surface being convex in a paraxial region thereof. Therefore, it is favorable for correcting the spherical aberration so as to improve the image quality.

The fifth lens element has an image-side surface being concave in a paraxial region thereof. Therefore, it is favorable for obtaining an optimized surface shape so as to enlarge the aperture and the field of view.

The sixth lens element can have an object-side surface being concave in a paraxial region thereof and have an image-side surface being convex in a paraxial region thereof. Therefore, it is favorable for effectively correcting the astigmatism so as to improve the image quality.

The seventh lens element has an image-side surface being concave in a paraxial region thereof, and the image-side surface of the seventh lens element includes at least one convex shape in an off-axial region thereof. Therefore, it is favorable for effectively reducing the incident angle of the off-axis on the image sensor so as to improve the photosensitivity, the image quality in the peripheral region and the relative illumination of the optical lens assembly.

When a curvature radius of the object-side surface of the sixth lens element is R11, and a focal length of the optical lens assembly is f, the following condition is satisfied: $R11/f<0$. Therefore, it is favorable for the optical lens assembly with large aperture and compact size to reduce the curved image, obtain the proper relative illumination and arrange the surface shape.

When an axial distance between the object-side surface of the first lens element and the image-side surface of the seventh lens element is Td, and a sum of central thicknesses of the first lens element, the second lens element, the third lens element, the fourth lens element, the fifth lens element, the sixth lens element and the seventh lens element is ICT, the following condition is satisfied: $1.0<Td/\Sigma CT<1.45$. Therefore, it is favorable for keeping compact among lens elements and preventing excessive air gap between every two lens elements so as to reduce the assembling difficulty.

When an Abbe number of the second lens element is V2, and an Abbe number of the fifth lens element is V5, the following condition is satisfied: 30<V2+V5<85. Therefore, it is favorable for the distribution of negative refractive power of the second lens element and the fifth lens element so as to improve the image quality.

When a curvature radius of the image-side surface of the seventh lens element is R14, and the focal length of the optical lens assembly is f, the following condition is satisfied: 0<R14/f<0.60. Therefore, it is favorable for the principal point of the optical lens assembly being positioned away from the image side so as to reduce the back focal length and maintain the compact size.

When the focal length of the optical lens assembly is f, and a composite focal length of the third lens element, the fourth lens element and the fifth lens element is f345, the following condition is satisfied: 0<f/f345<1.0. Therefore, it is favorable for the moldability and assembling of the optical lens assembly by the moderate change of the surface shape of the third lens element, the fourth lens element and the fifth lens element so as to obtain the arrangement of low photosensitivity and superior image.

When a distance in parallel with an optical axis from an axial vertex on the image-side surface of the fifth lens element to a maximum effective radius position on the image-side surface of the fifth lens element is Sag52, and a central thickness of the fifth lens element is CT5, the following condition is satisfied: |Sag52|/CT5<0.55. Therefore, the shape of the lens element would not be excessively curved, and it is favorable for manufacturing, molding and obtaining a more compact arrangement of the optical lens assembly. Preferably, the following condition is satisfied: |Sag52|/CT5<0.50.

When a central thickness of the sixth lens element is CT6, and a central thickness of the seventh lens element is CT7, the following condition is satisfied: CT6/CT7<2.50. Therefore, it is favorable for preventing the sixth lens element with excessive central thickness or the seventh lens element with insufficient central thickness so as to avoid the weak structure and reduce the difficulty of assembling.

The optical lens assembly can further include a stop, such as an aperture stop, disposed between an object and the third lens element. When an axial distance between the stop and the image-side surface of the seventh lens element is Sd, and the axial distance between the object-side surface of the first lens element and the image-side surface of the seventh lens element is Td, the following condition is satisfied: 0.80<Sd/Td<1.0. Therefore, it is favorable for balancing the telecentricity and the wide field of view so as to reduce the total track length and maintain the compact size.

When the axial distance between the object-side surface of the first lens element and the image-side surface of the seventh lens element is Td, and an entrance pupil diameter of the optical lens assembly is EPD, the following condition is satisfied: Td/EPD<3.20. Therefore; it is favorable for enhancing the exposure of the optical lens assembly and maintaining the compact size.

When a vertical distance between a non-axial critical point closest to an image surface in an off-axis region on the image-side surface of the third lens element and the optical axis is Yc32, and a vertical distance between a non-axial critical point closest to an image surface in an off-axis region on the image-side surface of the seventh lens element and the optical axis is Yc72, the following condition is satisfied: 0.3<Yc32/Yc72<0.75. Therefore, it is favorable for convergence of the light in the peripheral region of the image so as to improve the relative illumination and image clarity of the optical lens assembly.

When an axial distance between the object-side surface of the first lens element and an image surface is TL, and a maximum image height of the optical lens assembly is ImgH, the following condition is satisfied: TL/ImgH<1.80. Therefore, it is favorable for reducing the total track length of the optical lens assembly so as to maintain the compact size.

When the focal length of the optical lens assembly is f, and the maximum image height of the optical lens assembly is ImgH, the following condition is satisfied: f/ImgH<1.40. Therefore, it is favorable for enlarging the field of view and reducing the distortion of the optical lens assembly.

When a half of a maximal field of view of the optical lens assembly is HFOV, the following condition is satisfied: 0.70<tan(HFOV). Therefore, it is favorable for obtaining a wide field of view so as to obtain a wider imaging scene.

When a curvature radius of the object-side surface of the seventh lens element is R13, and a curvature radius of the image-side surface of the seventh lens element is R14, the following condition is satisfied: 0.30<(R13+R14)/(R13−R14). Therefore, it is favorable for reducing the back focal length so as to maintain the compact size.

According to the optical lens assembly of the present disclosure, the lens elements thereof can be made of plastic or glass material. When the lens elements are made of plastic material, the manufacturing cost can be effectively reduced. When the lens elements are made of glass material, the arrangement of the refractive power of the optical lens assembly may be more flexible to design. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical lens assembly can also be reduced.

According to the optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface is convex in the paraxial region thereof; when the lens element has a concave surface, it indicates that the surface is concave in the paraxial region thereof. Furthermore, when the lens element has positive refractive power or negative refractive power, it indicates that the lens element has refractive power in the paraxial region thereof. When the lens element has a focal length, it indicates that the lens element has a focal length in the paraxial region thereof.

According to the optical lens assembly of the present disclosure, a critical point is a non-axial point of the lens surface where its tangent is perpendicular to the optical axis.

According to the optical lens assembly of the present disclosure, the optical lens assembly can include at least one stop, such as an aperture stop, a glare stop or a field stop. The glare stop or the field stop is for eliminating the stray light and thereby improving the image resolution thereof.

According to the optical lens assembly of the present disclosure, the image surface, depending on the corresponding image sensor, can be a plane surface or a curved surface with any curvature. When the image surface is a curved surface, it is particularly indicates a concave surface toward the object side.

According to the optical lens assembly of the present disclosure, an aperture stop can be configured as a front stop or a middle stop. A front stop disposed between an imaged object and the first lens element can provide a longer distance between an exit pupil of the optical lens assembly and the image surface and thereby improves the image-sensing efficiency of an image sensor. A middle stop disposed between the first lens element and the image surface is favorable for enlarging the field of view of the optical lens assembly and thereby provides a wider field of view for the same.

According to the optical lens assembly of the present disclosure, the optical lens assembly can be optionally applied to moving focus optical systems. Furthermore, the optical lens assembly is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

According to the present disclosure, an image capturing apparatus is provided. The image capturing apparatus includes the aforementioned optical lens assembly according to the present disclosure and an image sensor, wherein the image sensor is disposed on or near an image surface of the aforementioned optical lens assembly. In the optical lens assembly of the image capturing apparatus, it is favorable for obtaining large aperture and short total track length by the proper arrangement of the surface shape of the fifth lens element and the seventh lens element so as to apply to the compact electronic devices. Moreover, the curvature radius of the sixth lens element and the focal length of the optical lens assembly are properly distributed, so that large aperture and compact size of the optical lens assembly can be maintained, the curved image can be reduced effectively, the proper relative illumination can be obtained and the surface shape can be arranged properly. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for obtaining a wider field of view. Preferably, the electronic device can further include but not limited to a control unit, a display, a storage unit, a random access memory unit (RAM) or a combination thereof.

According to the above description of the present disclosure, the following 1st-9th specific embodiments are provided for further explanation.

1st Embodiment

Figure 2:
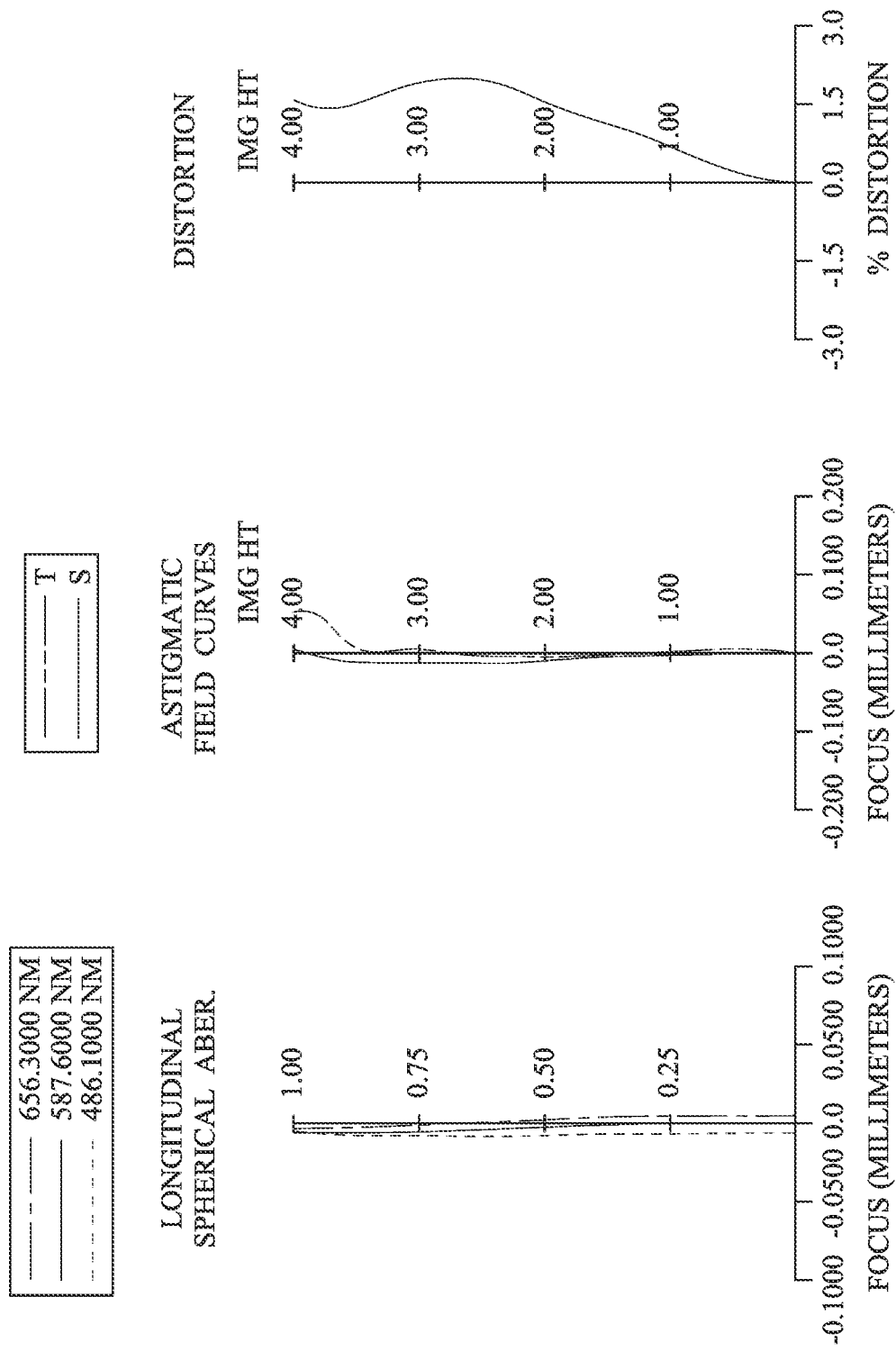
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment. In FIG. 1, the image capturing apparatus includes the optical lens assembly (its reference numeral is omitted) and an image sensor 195. The optical lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190. The image sensor 195 is disposed on the image surface 190 of the optical lens assembly. The optical lens assembly has a total of seven lens elements (110-170) with refractive power. Moreover, there is an air gap on the optical axis between every two of the first lens element 110, the second lens element 120, the third lens element 130, the fourth lens element 140, the fifth lens element 150, the sixth lens element 160 and the seventh lens element 170 that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. Furthermore, the image-side surface 172 of the seventh lens element 170 includes at least one convex shape in an off-axial region thereof.

The IR-cut filter 180 is made of glass material and located between the seventh lens element 170 and the image surface 190, and will not affect the focal length of the optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens assembly of the image capturing apparatus according to the 1st embodiment, when a focal length of the optical lens assembly is f, an f-number of the optical lens assembly is Fno, and half of a maximal field of view of the optical lens assembly is HFOV, these parameters have the following values: f=5.04 mm; Fno=2.30; and HFOV=38.0 degrees.

In the optical lens assembly of the image capturing apparatus according to the 1st embodiment, when a half of a maximal field of view of the optical lens assembly is HFOV, the following condition is satisfied: tan(HFOV)=0.78.

In the optical lens assembly of the image capturing apparatus according to the 1st embodiment, when an Abbe number of the second lens element 120 is V2, and an Abbe number of the fifth lens element 150 is V5, the following condition is satisfied: V2+V5=79.3.

In the optical lens assembly of the image capturing apparatus according to the 1st embodiment, when an axial distance between the aperture stop 100 and the image-side surface 172 of the seventh lens element 170 is Sd, and the axial distance between the object-side surface 111 of the first lens element 110 and the image-side surface 172 of the seventh lens element 170 is Td, the following condition is satisfied: Sd/Td=0.95.

In the optical lens assembly of the image capturing apparatus according to the 1st embodiment, when the axial distance between the object-side surface 111 of the first lens element 110 and the image-side surface 172 of the seventh lens element 170 is Td, and an entrance pupil diameter of the optical lens assembly is EPD, the following conditions is satisfied: Td/EPD=2.36.

In the optical lens assembly of the image capturing apparatus according to the 1st embodiment, when an axial distance between the object-side surface 111 of the first lens element 110 and the image-side surface 172 of the seventh lens element 170 is Td, a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, and a sum of central thicknesses of the first lens element 110, the second lens element 120, the third lens element 130, the fourth lens element 140, the fifth lens element 150, the sixth lens element 160 and the seventh lens element 170 is ΣCT (ΣCT=CT1+CT2+CT3+CT4+CT5+CT6+CT7), the following condition is satisfied: Td/ΣCT=1.37.

In the optical lens assembly of the image capturing apparatus according to the 1st embodiment, when the central thickness of the sixth lens element 160 is CT6, and the central thickness of the seventh lens element 170 is CT7, the following condition is satisfied: CT6/CT7=0.42.

In the optical lens assembly of the image capturing apparatus according to the 1st embodiment, when an axial distance between the object-side surface 111 of the first lens element 110 and the image surface 190 is TL, and a maximum image height of the optical lens assembly (half of a diagonal length of an effective photosensitive area of the image sensor 195) is ImgH, the following condition is satisfied: TL/ImgH=1.61.

Figure 13:
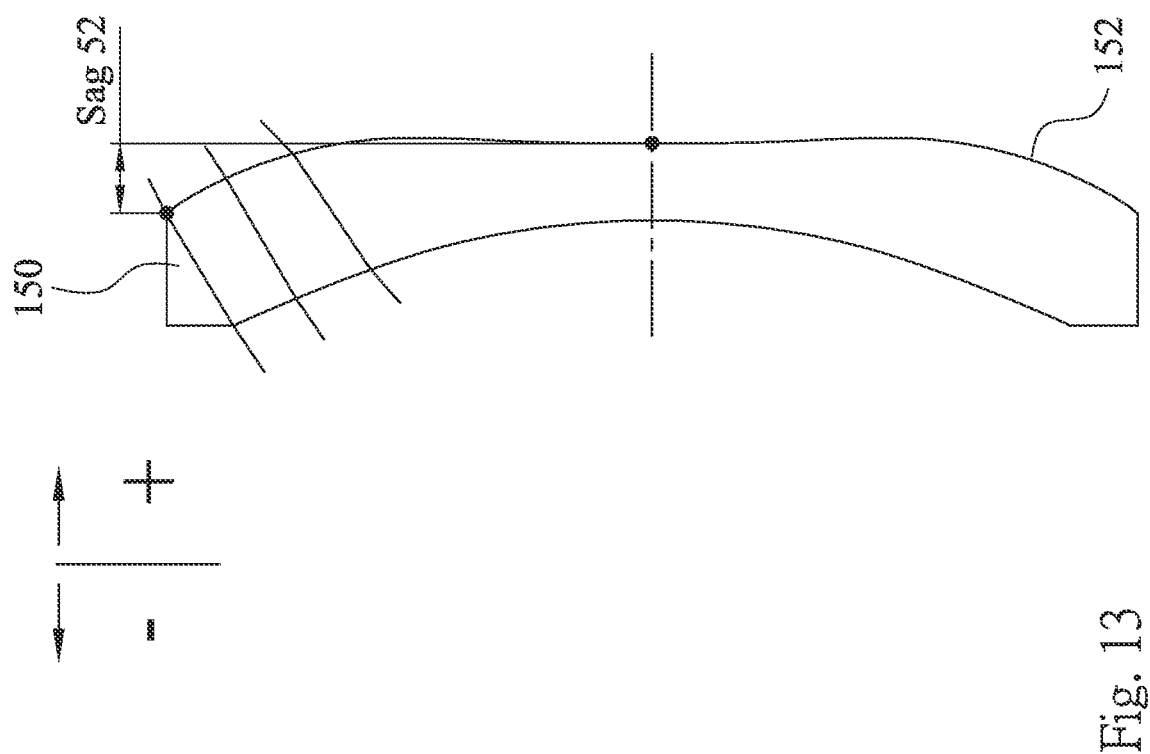
FIG. 13 shows a schematic view of the parameter Sag52 of the optical lens assembly of the image capturing apparatus according to FIG. 1.

FIG. 13 shows a schematic view of the parameter Sag52 of the optical lens assembly of the image capturing apparatus according to FIG. 1. In FIG. 13, when a distance in parallel with the optical axis from an axial vertex on the image-side surface 152 of the fifth lens element 150 to a maximum effective radius position on the image-side surface 152 of the fifth lens element 150 is Sag52 (Sag52 is a negative value with the distance in parallel with the optical axis towards the object side; Sag52 is a positive value with the distance in parallel with the optical axis towards the image side.), and the central thickness of the fifth lens element 150 is CT5, the following condition is satisfied: |Sag52|/CT5=0.91.

In the optical lens assembly of the image capturing apparatus according to the 1st embodiment, when a curvature radius of the object-side surface 161 of the sixth lens element 160 is R11, and the focal length of the optical lens assembly is f, the following condition is satisfied: R11/f=−19.16.

In the optical lens assembly of the image capturing apparatus according to the 1st embodiment, when a curvature radius of the image-side surface 172 of the seventh lens element 170 is R14, and the focal length of the optical lens assembly is f, the following condition is satisfied: R14/f=0.32.

In the optical lens assembly of the image capturing apparatus according to the 1st embodiment, when a curvature radius of the object-side surface 171 of the seventh lens element 170 is R13, and the curvature radius of the image-side surface 172 of the seventh lens element 170 is R14, the following condition is satisfied: (R13+R14)/(R13−R14)=4.89.

In the optical lens assembly of the image capturing apparatus according to the 1st embodiment, when the focal length of the optical lens assembly is f, and a composite focal length of the third lens element 130, the fourth lens element 140 and the fifth lens element 150 is f345, the following condition is satisfied: f/f345=0.17.

In the optical lens assembly of the image capturing apparatus according to the 1st embodiment, when the focal length of the optical lens assembly is f, and the maximum image height of the optical lens assembly is ImgH, the following condition is satisfied: f/ImgH=1.26.

The detailed optical data of the 1st embodiment are shown in TABLE 1 and the aspheric surface data are shown in TABLE 2 below.

TABLE 1

1st Embodiment
f = 5.04 mm, Fno = 2.30, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.284 | | | | |
| 2 | Lens 1 | 2.233 | ASP | 0.530 | Plastic | 1.544 | 55.9 | 4.69 |
| 3 | | 16.435 | ASP | 0.227 | | | | |
| 4 | Lens 2 | 5.991 | ASP | 0.250 | Plastic | 1.639 | 23.5 | −6.49 |
| 6 | | 2.411 | ASP | 0.097 | | | | |
| 6 | Lens 3 | 2.758 | ASP | 0.303 | Plastic | 1.514 | 56.8 | 24.75 |
| 7 | | 3.391 | ASP | 0.429 | | | | |
| 8 | Lens 4 | 13.374 | ASP | 0.690 | Plastic | 1.544 | 55.9 | 7.16 |
| 9 | | −5.402 | ASP | 0.209 | | | | |
| 10 | Lens 5 | −3.495 | ASP | 0.320 | Plastic | 1.530 | 55.8 | −6.36 |
| 11 | | 96.963 | ASP | 0.095 | | | | |
| 12 | Lens 6 | −96.573 | ASP | 0.494 | Plastic | 1.544 | 55.9 | 9.58 |
| 13 | | −4.955 | ASP | 0.355 | | | | |
| 14 | Lens 7 | 2.407 | ASP | 1.182 | Plastic | 1.544 | 55.9 | −17.53 |
| 15 | | 1.590 | ASP | 0.750 | | | | |
| 16 | IR-cut filter | Plano | | 0.175 | Glass | 1.517 | 64.2 | — |
| 17 | | Plano | | 0.354 | | | | |
| 18 | Image | Plano | | — | | | | |

Note:
Reference wavelength is 587.6 nm (d-line).

TABLE 2

Aspheric Coefficients

| Surface # | 2 | 3 | 4 | 5 | 6 | 7 | 8 |
|---|---|---|---|---|---|---|---|
| k = | −1.6248E+00 | 5.0000E+00 | −7.6836E+00 | −1.0000E+00 | 8.1379E−01 | 1.7725E+00 | −1.0000E+00 |
| A4 = | 2.0019E−02 | −5.5157E−03 | −2.7241E−02 | −2.5240E−02 | −5.5024E−02 | −5.3487E−02 | −2.6883E−02 |
| A6 = | 4.3467E−03 | 8.5284E−03 | 7.0085E−03 | 1.2755E−02 | 2.7296E−02 | 2.0228E−02 | −2.9367E−03 |
| A8 = | −2.6553E−03 | −1.2728E−02 | −1.1189E−02 | −5.2120E−03 | −2.5116E−02 | −1.3427E−02 | −1.7395E−02 |
| A10 = | 1.1450E−03 | 6.5279E−03 | 9.6814E−03 | −2.9593E−03 | 1.6585E−02 | 4.8958E−03 | 2.9617E−02 |
| A12 = | 6.2147E−04 | 2.1245E−03 | −3.0487E−03 | 7.1527E−03 | −9.6047E−03 | −3.9492E−04 | −2.6905E−02 |
| A14 = | −1.3952E−04 | −2.8374E−03 | −3.5311E−04 | −3.7546E−03 | 5.2744E−03 | 5.5970E−04 | 1.1653E−02 |
| A16 = | −2.4138E−04 | 3.2642E−04 | 5.2475E−05 | 6.8686E−04 | −1.1018E−03 | −1.0316E−04 | −1.7876E−03 |

| Surface # | 9 | 10 | 11 | 12 | 13 | 14 | 15 |
|---|---|---|---|---|---|---|---|
| k = | −2.1444E+00 | 2.9289E−01 | 5.0000E+00 | −2.0000E+01 | 1.5583E+00 | −1.0000E+01 | −3.4838E+00 |
| A4 = | −9.3886E−03 | 2.7878E−02 | 1.0192E−01 | 1.1933E−01 | −8.8084E−02 | −1.1814E−01 | −5.7233E−02 |
| A6 = | −2.7477E−02 | −8.1762E−02 | −1.3693E−01 | −1.0169E−01 | 9.5755E−02 | 3.5112E−02 | 1.7202E−02 |
| A8 = | 1.6418E−02 | 9.5940E−02 | 6.9012E−02 | 3.7754E−02 | −4.7483E−02 | −5.1941E−03 | −3.3887E−03 |
| A10 = | −8.1849E−03 | −6.1399E−02 | −1.9060E−02 | −8.4802E−03 | 1.3772E−02 | 4.5049E−04 | 4.2121E−04 |
| A12 = | 2.1391E−03 | 2.3015E−02 | 2.8526E−03 | 9.5315E−04 | −2.3052E−03 | −2.2847E−05 | −3.2408E−05 |
| A14 = | −1.9905E−04 | −4.6577E−03 | −1.8693E−04 | −1.0509E−05 | 2.0603E−04 | 6.1129E−07 | 1.4002E−06 |
| A16 = | 3.9771E−05 | 3.8835E−04 | 9.4522E−07 | −4.4244E−06 | −7.6055E−06 | −6.7107E−09 | −2.5728E−08 |

In TABLE 1, the curvature radius, the thickness and the focal length are shown in millimeters (mm). Surface numbers 0-18 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
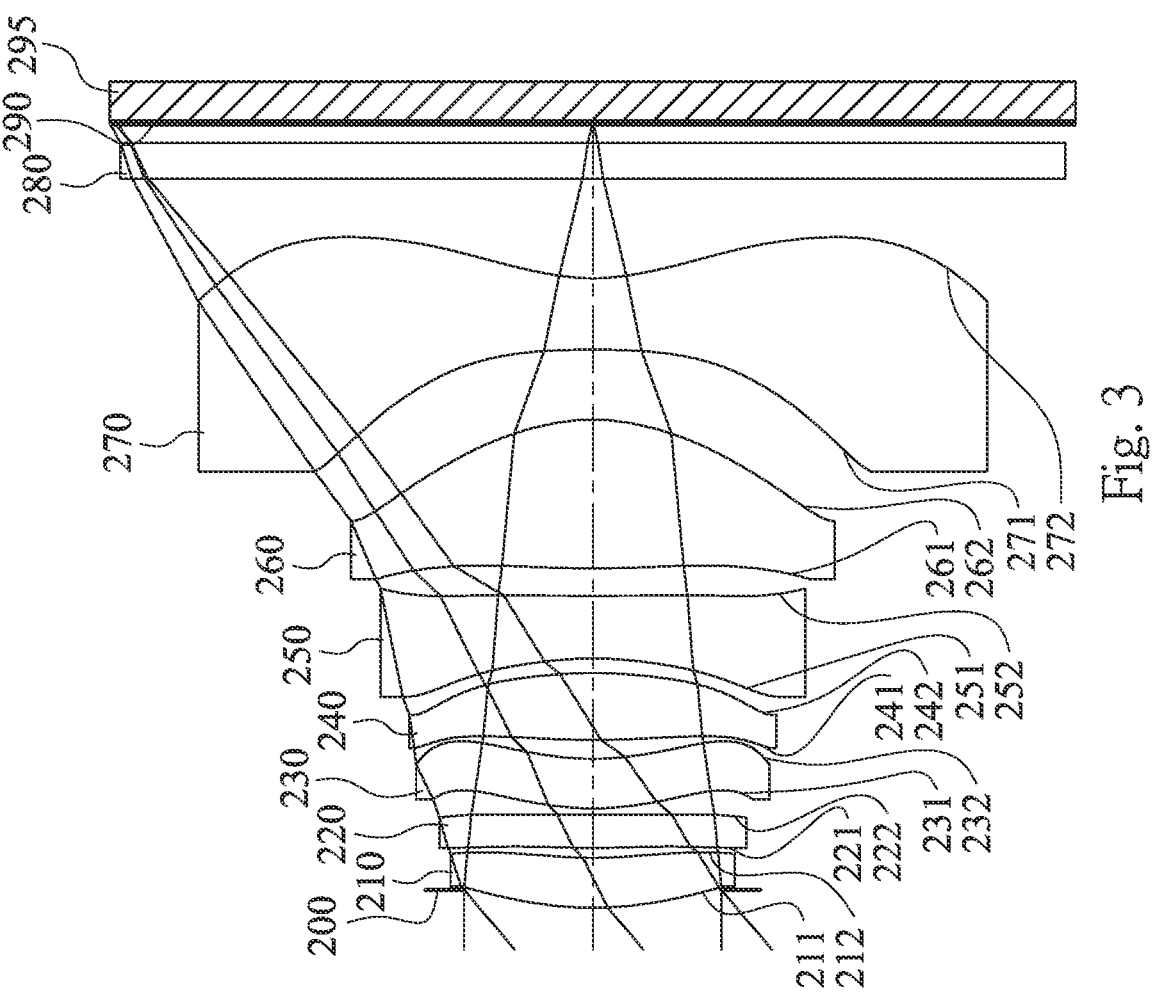
FIG. 3 is a schematic view of an image capturing apparatus according to the 2nd embodiment of the present disclosure.
Figure 4:
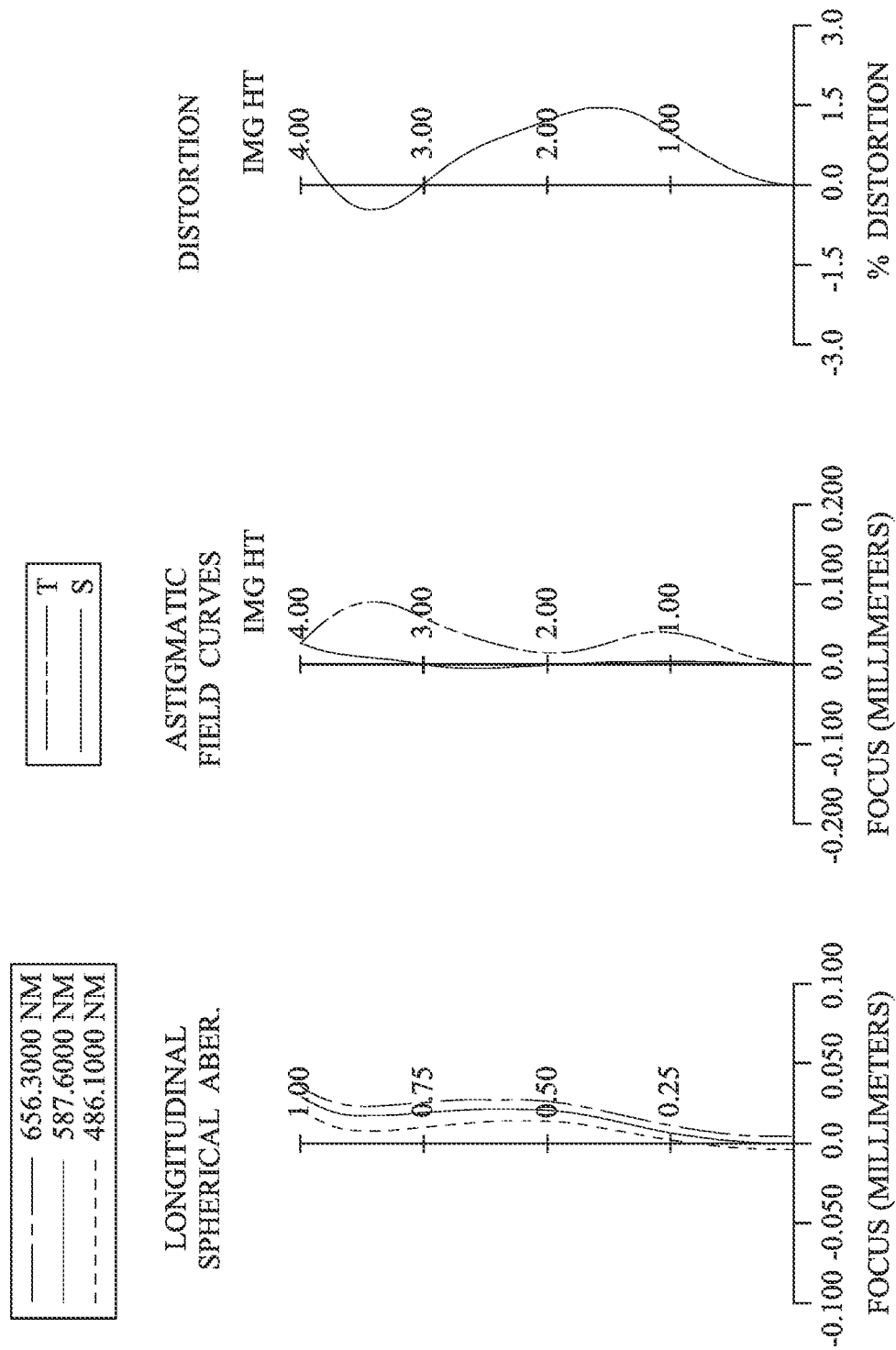
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes the optical lens assembly (its reference numeral is omitted) and an image sensor 295. The optical lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290. The image sensor 295 is disposed on the image surface 290 of the optical lens assembly. The optical lens assembly has a total of seven lens elements (210-270) with refractive power. Moreover, there is an air gap on the optical axis between every two of the first lens element 210, the second lens element 220, the third lens element 230, the fourth lens element 240, the fifth lens element 250, the sixth lens element 260 and the seventh lens element 270 that are adjacent to each other.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with negative refractive power has an object-side surface 271 being concave in a paraxial region thereof and an image-side surface 272 being concave in a paraxial region thereof. The seventh lens element 270 is made of plastic material and has the object-side surface 271 and the image-side surface 272 being both aspheric. Furthermore, the image-side surface 272 of the seventh lens element 270 includes at least one convex shape in an off-axial region thereof.

The IR-cut filter 280 is made of glass material and located between the seventh lens element 270 and the image surface 290, and will not affect the focal length of the optical lens assembly.

Figure 15:
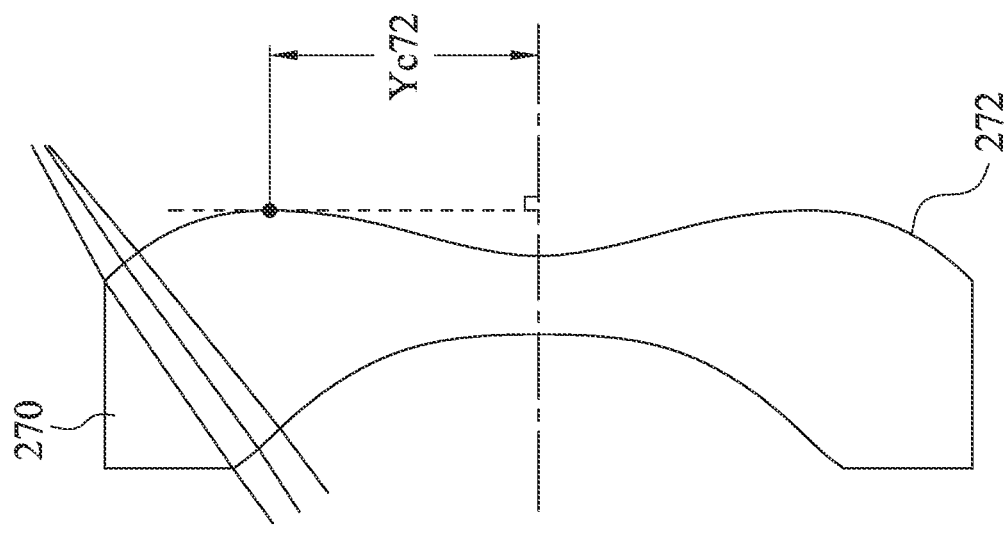
FIG. 15 shows a schematic view of the parameter Yc72 of the optical lens assembly of the image capturing apparatus according to FIG. 3.
Figure 14:
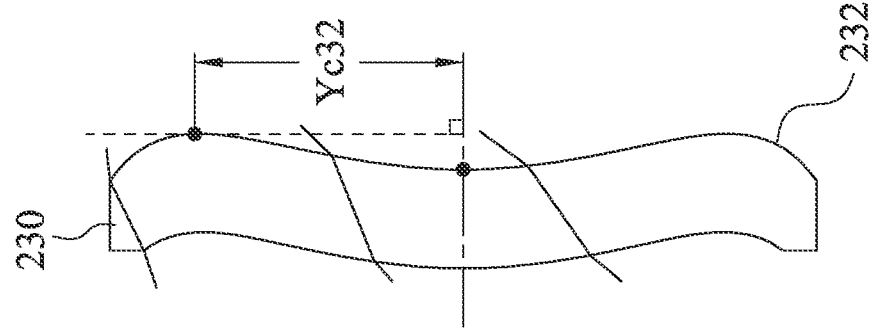
FIG. 14 shows a schematic view of the parameter Yc32 of the optical lens assembly of the image capturing apparatus according to FIG. 3.

FIG. 14 shows a schematic view of the parameter Yc32 of the optical lens assembly of the image capturing apparatus according to FIG. 3. FIG. 15 shows a schematic view of the parameter Yc72 of the optical lens assembly of the image capturing apparatus according to FIG. 3. In FIG. 14 and FIG. 15, when a vertical distance between a non-axial critical point closest to an image surface in an off-axis region on the image-side surface 232 of the third lens element 230 and the optical axis is Yc32, and a vertical distance between a non-axial critical point closest to an image surface in an off-axis region on the image-side surface 272 of the seventh lens element 270 and the optical axis is Yc72, the following condition is satisfied: Yc32/Yc72=0.54.

The detailed optical data of the 2nd embodiment are shown in TABLE 3 and the aspheric surface data are shown in TABLE 4 below.

TABLE 3

2nd Embodiment
f = 4.65 mm, Fno = 2.15, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.150 | | | | |
| 2 | Lens 1 | 2.960 | ASP | 0.420 | Plastic | 1.514 | 56.8 | 38.87 |
| 3 | | 3.307 | ASP | 0.084 | | | | |
| 4 | Lens 2 | 6.630 | ASP | 0.278 | Plastic | 1.544 | 55.9 | 14.03 |
| 5 | | 49.712 | ASP | 0.056 | | | | |
| 6 | Lens 3 | 2.444 | ASP | 0.416 | Plastic | 1.544 | 55.9 | 162.13 |
| 7 | | 2.363 | ASP | 0.160 | | | | |
| 8 | Lens 4 | 7.569 | ASP | 0.563 | Plastic | 1.544 | 55.9 | 4.73 |
| 9 | | −3.800 | ASP | 0.123 | | | | |
| 10 | Lens 5 | −2.969 | ASP | 0.528 | Plastic | 1.639 | 23.5 | −4.47 |
| 11 | | 82.403 | ASP | 0.231 | | | | |
| 12 | Lens 6 | 9.510 | ASP | 1.250 | Plastic | 1.530 | 55.8 | 2.99 |
| 13 | | −1.815 | ASP | 0.591 | | | | |
| 14 | Lens 7 | −7.522 | ASP | 0.600 | Plastic | 1.514 | 56.8 | −2.89 |
| 15 | | 1.898 | ASP | 0.840 | | | | |
| 16 | IR-cut filter | Plano | | 0.300 | Glass | 1.517 | 64.2 | — |
| 17 | | Plano | | 0.166 | | | | |
| 18 | Image | Plano | | — | | | | |

Note:
Reference wavelength is 587.6 nm (d-line).

TABLE 4

Aspheric Coefficients

| Surface # | 2 | 3 | 4 | 5 | 6 | 7 | 8 |
|---|---|---|---|---|---|---|---|
| k = | −2.0939E+00 | −2.0905E+01 | 0.0000E+00 | −1.0000E+00 | −3.2092E+00 | −1.9526E+00 | −2.0000E+01 |
| A4 = | −2.0747E−02 | −1.0411E−01 | −1.4083E−01 | −1.4779E−02 | −2.0131E−02 | −5.4365E−02 | −2.3983E−02 |

TABLE 4-continued

| Aspheric Coefficients | | | | | | | |
|---|---|---|---|---|---|---|---|
| A6 = | 2.0940E−02 | 4.2868E−02 | 9.7817E−02 | 2.6894E−02 | −1.6975E−02 | 5.4301E−03 | −5.4118E−03 |
| A8 = | −9.3997E−03 | −1.1417E−02 | −3.8791E−02 | −2.7733E−02 | −2.6216E−03 | −1.0637E−02 | 1.3182E−03 |
| A10 = | −1.2853E−02 | −3.2821E−03 | 5.1750E−03 | 9.4238E−03 | −2.8438E−03 | −3.5097E−04 | −1.9507E−03 |
| A12 = | 1.6050E−02 | 1.6226E−02 | 1.0680E−02 | −2.3576E−03 | | | −9.7462E−04 |
| A14 = | −5.5323E−03 | −8.0878E−03 | −5.4479E−03 | 5.2035E−04 | | | 6.4967E−04 |

| Surface # | 9 | 10 | 11 | 12 | 13 | 14 | 15 |
|---|---|---|---|---|---|---|---|
| k = | −2.0000E+01 | −4.8158E−01 | −1.0000E+00 | 5.7184E+00 | −3.6113E+00 | −1.1322E+00 | −4.1978E+00 |
| A4 = | 1.4025E−02 | 9.6309E−02 | 1.0726E−02 | −3.9919E−02 | −2.0581E−02 | −4.2234E−02 | −4.1540E−02 |
| A6 = | −4.8831E−02 | −1.1749E−01 | −3.1344E−02 | 1.3514E−02 | −3.9567E−03 | −1.5286E−02 | 8.4931E−03 |
| A8 = | 7.8545E−03 | 6.8594E−02 | 2.1783E−02 | −6.3259E−03 | 6.5876E−03 | 1.5168E−02 | −9.7493E−04 |
| A10 = | 9.6945E−04 | −2.7529E−02 | −7.2931E−03 | 1.1799E−03 | −2.4765E−03 | −4.7729E−03 | 4.2854E−05 |
| A12 = | 7.6967E−05 | 8.2703E−03 | 1.6429E−03 | 8.7374E−05 | 3.5230E−04 | 6.7202E−04 | 3.8335E−07 |
| A14 = | 2.1061E−04 | −1.0879E−03 | −1.8773E−04 | −3.5512E−05 | −8.3722E−06 | −3.4864E−05 | −5.8223E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 4.65 | TL/ImgH | 1.65 |
| Fno | 2.15 | |Sag52|/CT5 | 0.11 |
| HFOV (deg.) | 40.4 | Yc32/Yc72 | 0.54 |
| tan(HFOV) | 0.85 | R11/f | 2.05 |
| V2 + V5 | 79.4 | R14/f | 0.41 |
| Sd/Td | 0.97 | (R13 + R14)/(R13 − R14) | 0.60 |
| Td/EPD | 2.45 | f/f345 | 0.03 |
| Td/ΣCT | 1.31 | f/ImgH | 1.16 |
| CT6/CT7 | 2.08 | | |

3rd Embodiment

Figure 5:
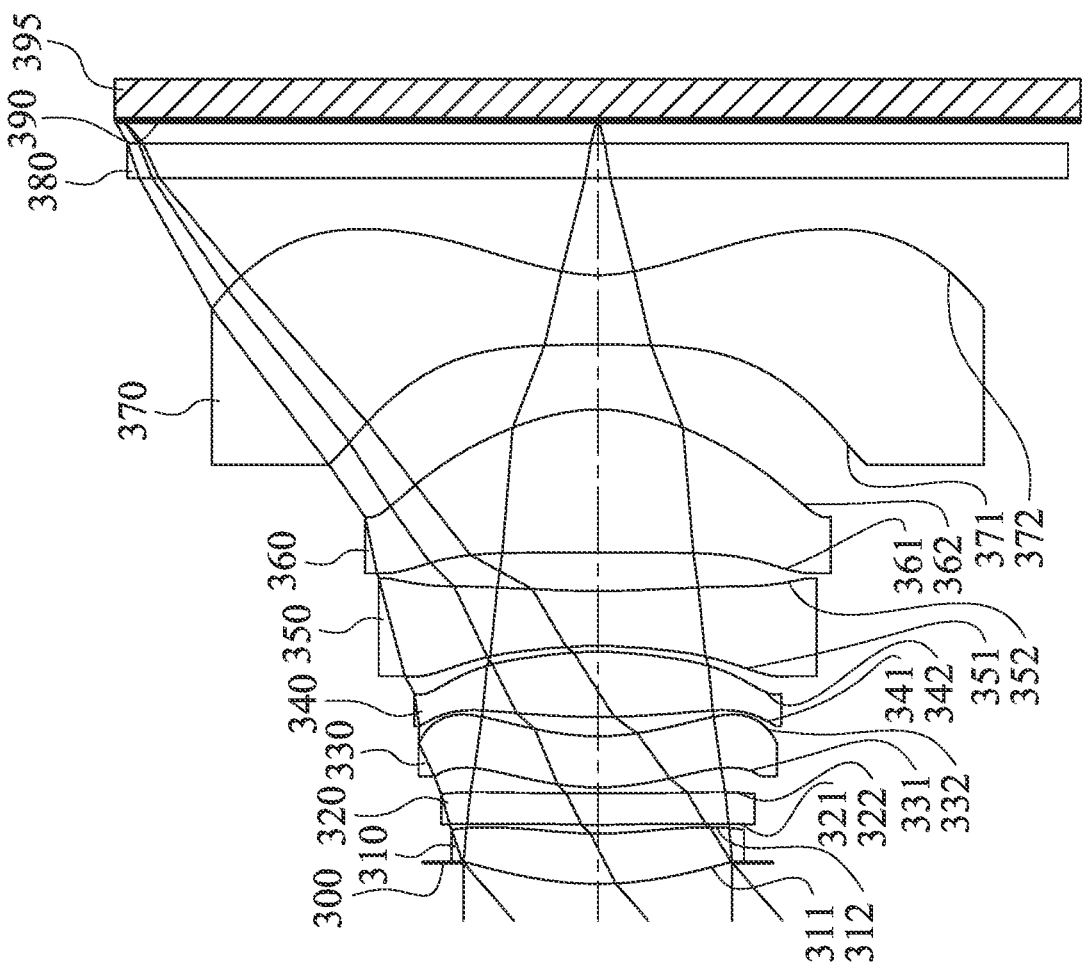
FIG. 5 is a schematic view of an image capturing apparatus according to the 3rd embodiment of the present disclosure.
Figure 6:
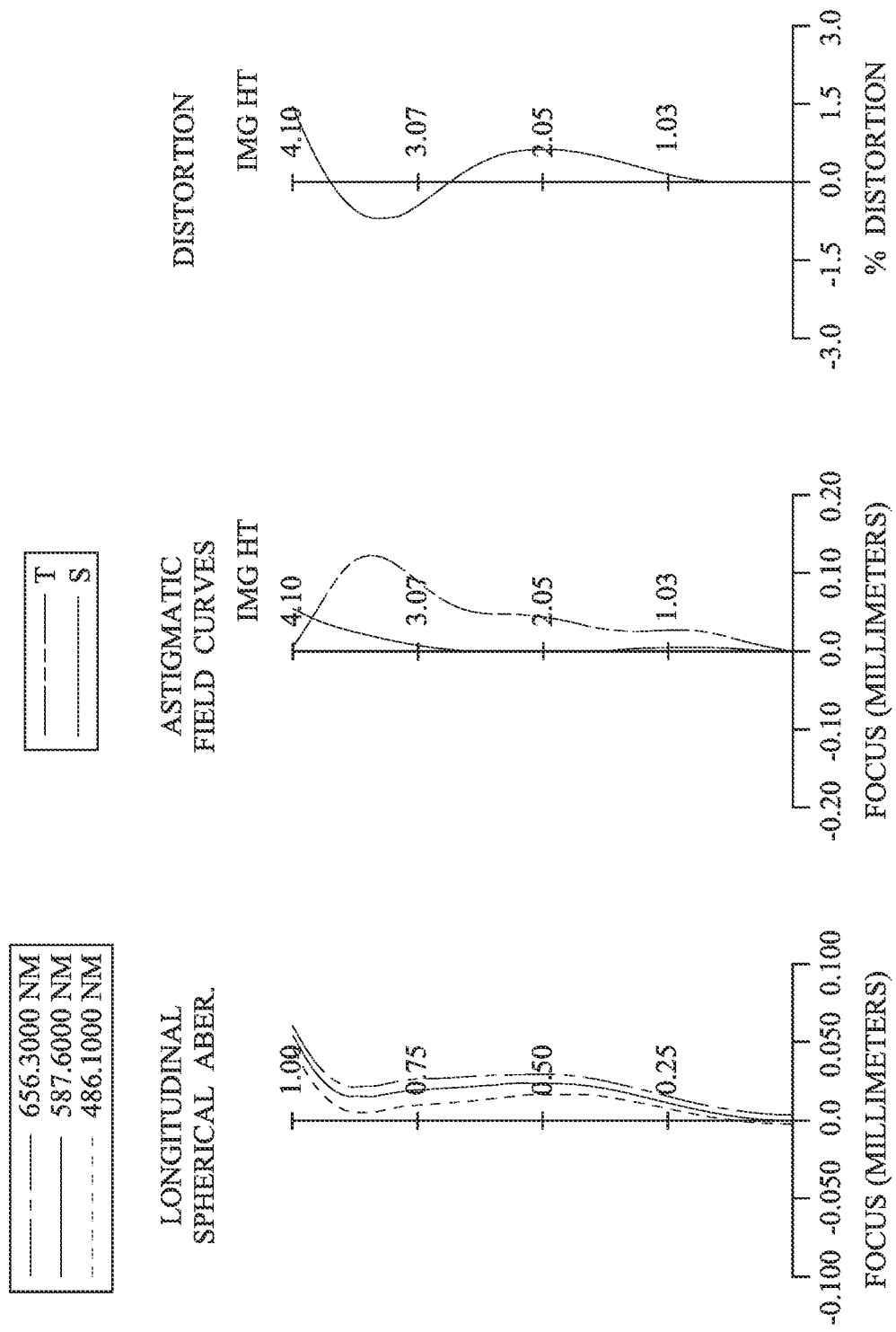
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to the 3rd embodiment. In FIG. 5, the image capturing apparatus includes the optical lens assembly (its reference numeral is omitted) and an image sensor 395. The optical lens assembly includes, in order from an object side to an image side, an aperture stop 300, a first lens element 310, a second lens element 320, a third lens element 330, a fourth lens element 340, a fifth lens element 350, a sixth lens element 360, a seventh lens element 370, an IR-cut filter 380 and an image surface 390. The image sensor 395 is disposed on the image surface 390 of the optical lens assembly. The optical lens assembly has a total of seven lens elements (310-370) with refractive power. Moreover, there is an air gap on the optical axis between every two of the first lens element 310, the second lens element 320, the third lens element 330, the fourth lens element 340, the fifth lens element 350, the sixth lens element 360 and the seventh lens element 370 that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with positive refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric.

The seventh lens element 370 with negative refractive power has an object-side surface 371 being concave in a paraxial region thereof and an image-side surface 372 being concave in a paraxial region thereof. The seventh lens element 370 is made of plastic material and has the object-side surface 371 and the image-side surface 372 being both aspheric. Furthermore, the image-side surface 372 of the seventh lens element 370 includes at least one convex shape in an off-axial region thereof.

The JR-cut filter 380 is made of glass material and located between the seventh lens element 370 and the image surface 390, and will not affect the focal length of the optical lens assembly.

The detailed optical data of the 3rd embodiment are shown in TABLE 5 and the aspheric surface data are shown in TABLE 6 below.

TABLE 5

3rd Embodiment
f = 4.64 mm, Fno = 2.00, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.183 | | | | |
| 2 | Lens 1 | 2.968 | ASP | 0.434 | Plastic | 1.514 | 56.8 | 85.93 |
| 3 | | 3.023 | ASP | 0.076 | | | | |
| 4 | Lens 2 | 7.126 | ASP | 0.275 | Plastic | 1.544 | 55.9 | 14.55 |
| 5 | | 67.767 | ASP | 0.050 | | | | |
| 6 | Lens 3 | 2.287 | ASP | 0.442 | Plastic | 1.544 | 55.9 | 117.88 |
| 7 | | 2.209 | ASP | 0.166 | | | | |
| 8 | Lens 4 | 6.388 | ASP | 0.565 | Plastic | 1.544 | 55.9 | 3.84 |
| 9 | | −3.030 | ASP | 0.050 | | | | |
| 10 | Lens 5 | −4.074 | ASP | 0.476 | Plastic | 1.639 | 23.5 | −4.36 |
| 11 | | 9.481 | ASP | 0.334 | | | | |
| 12 | Lens 6 | −34.556 | ASP | 1.234 | Plastic | 1.530 | 55.8 | 3.02 |
| 13 | | −1.553 | ASP | 0.562 | | | | |
| 14 | Lens 7 | −25.506 | ASP | 0.600 | Plastic | 1.514 | 56.8 | −2.70 |
| 15 | | 1.484 | ASP | 0.840 | | | | |
| 16 | IR-cut filter | Plano | | 0.300 | Glass | 1.519 | 64.2 | — |
| 17 | | Plano | | 0.197 | | | | |
| 18 | Image | Plano | | — | | | | |

Note:
Reference wavelength is 587.6 nm (d-line).

TABLE 6

Aspheric Coefficients

| Surface # | 2 | 3 | 4 | 5 | 6 | 7 | 8 |
|---|---|---|---|---|---|---|---|
| k = | −2.9875E+00 | −1.8419E+01 | 0.0000E+00 | −1.0000E+00 | −3.2732E+00 | −1.4055E+00 | 2.9726E+00 |
| A4 = | −2.1311E−02 | −1.0748E−01 | −1.3486E−01 | −6.9456E−03 | −1.9888E−02 | −5.0154E−02 | −1.8421E−02 |
| A6 = | 3.0511E−02 | 4.6144E−02 | 9.7600E−02 | 2.5899E−02 | −1.6587E−02 | 7.4581E−03 | 8.4578E−04 |
| A8 = | −2.0597E−02 | −1.3045E−02 | −3.3164E−02 | −2.4166E−02 | −3.8105E−03 | −1.0094E−02 | −1.6620E−03 |
| A10 = | −8.7742E−03 | −2.7408E−03 | 2.2853E−03 | 8.1611E−03 | −1.3410E−04 | −6.9773E−04 | −3.3565E−03 |
| A12 = | 1.6050E−02 | 1.6226E−02 | 1.0680E−02 | −2.3576E−03 | | | −1.1178E−03 |
| A14 = | −5.5323E−03 | −8.0878E−03 | −5.4479E−03 | 5.2035E−04 | | | 7.5884E−04 |

| Surface # | 9 | 10 | 11 | 12 | 13 | 14 | 15 |
|---|---|---|---|---|---|---|---|
| k = | −2.0000E+01 | 9.8256E−01 | −1.0000E+00 | 3.0000E+00 | −4.0027E+00 | −1.1322E+00 | −5.7862E+00 |
| A4 = | 3.0852E−02 | 8.6396E−02 | −7.4135E−03 | 2.3096E−02 | −1.5001E−02 | −4.9004E−02 | −2.5015E−02 |
| A6 = | −5.4531E−02 | −1.1576E−01 | −2.6931E−02 | −3.9596E−02 | −7.0085E−03 | 2.6225E−03 | 3.1451E−03 |
| A8 = | 7.1141E−03 | 6.9426E−02 | 2.1329E−02 | 2.4146E−02 | 5.9306E−03 | −8.0242E−04 | −1.9846E−04 |
| A10 = | 1.0817E−03 | −2.7804E−02 | −7.4233E−03 | −1.2448E−02 | −2.5159E−03 | 6.3336E−04 | −1.2509E−05 |
| A12 = | 1.8454E−04 | 8.0448E−03 | 1.6331E−03 | 3.6069E−03 | 3.7442E−04 | −1.5799E−04 | 1.9163E−06 |
| A14 = | 1.6806E−04 | −1.0220E−03 | −1.7639E−04 | −3.7790E−04 | 1.8537E−06 | 1.3257E−05 | −5.8223E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 3rd embodiment, so an explanation in this regard will not be provided again.

Moreover, these parameters can be calculated from TABLE 5 and TABLE 6 as the following values and satisfy the following conditions:

3rd Embodiment

| f (mm) | 4.64 | TL/ImgH | 1.61 |
|---|---|---|---|
| Fno | 2.00 | |Sag52|/CT6 | 0.22 |
| HFOV (deg.) | 41.0 | Yc32/Yc72 | 0.58 |
| tan(HFOV) | 0.87 | R11/f | −7.45 |
| V2 + V5 | 79.4 | R14/f | 0.32 |

-continued

3rd Embodiment

| Sd/Td | 0.97 | (R13 + R14)/(R13 − R14) | 0.89 |
|---|---|---|---|
| Td/EPD | 2.27 | f/f345 | 0.24 |
| Td/ΣCT | 1.31 | f/ImgH | 1.13 |
| CT6/CT7 | 2.06 | | |

4th Embodiment

Figure 7:
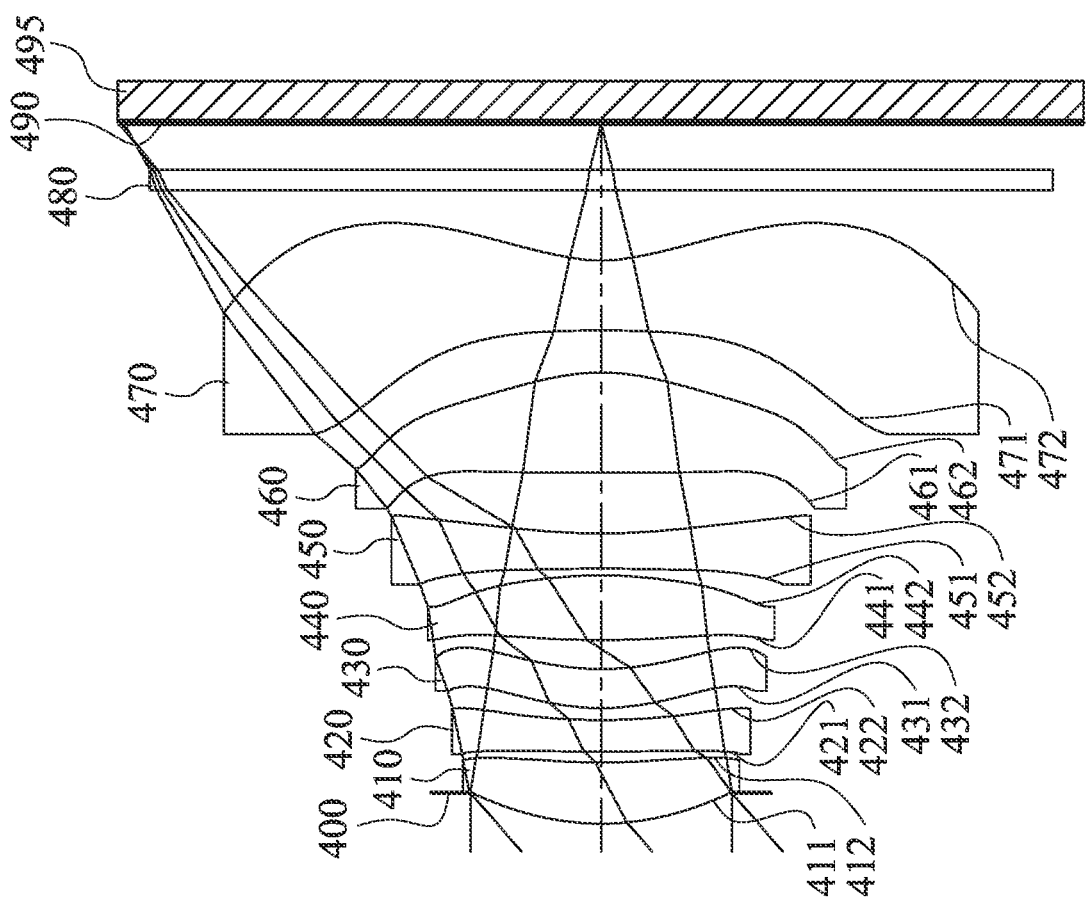
FIG. 7 is a schematic view of an image capturing apparatus according to the 4th embodiment of the present disclosure.
Figure 8:
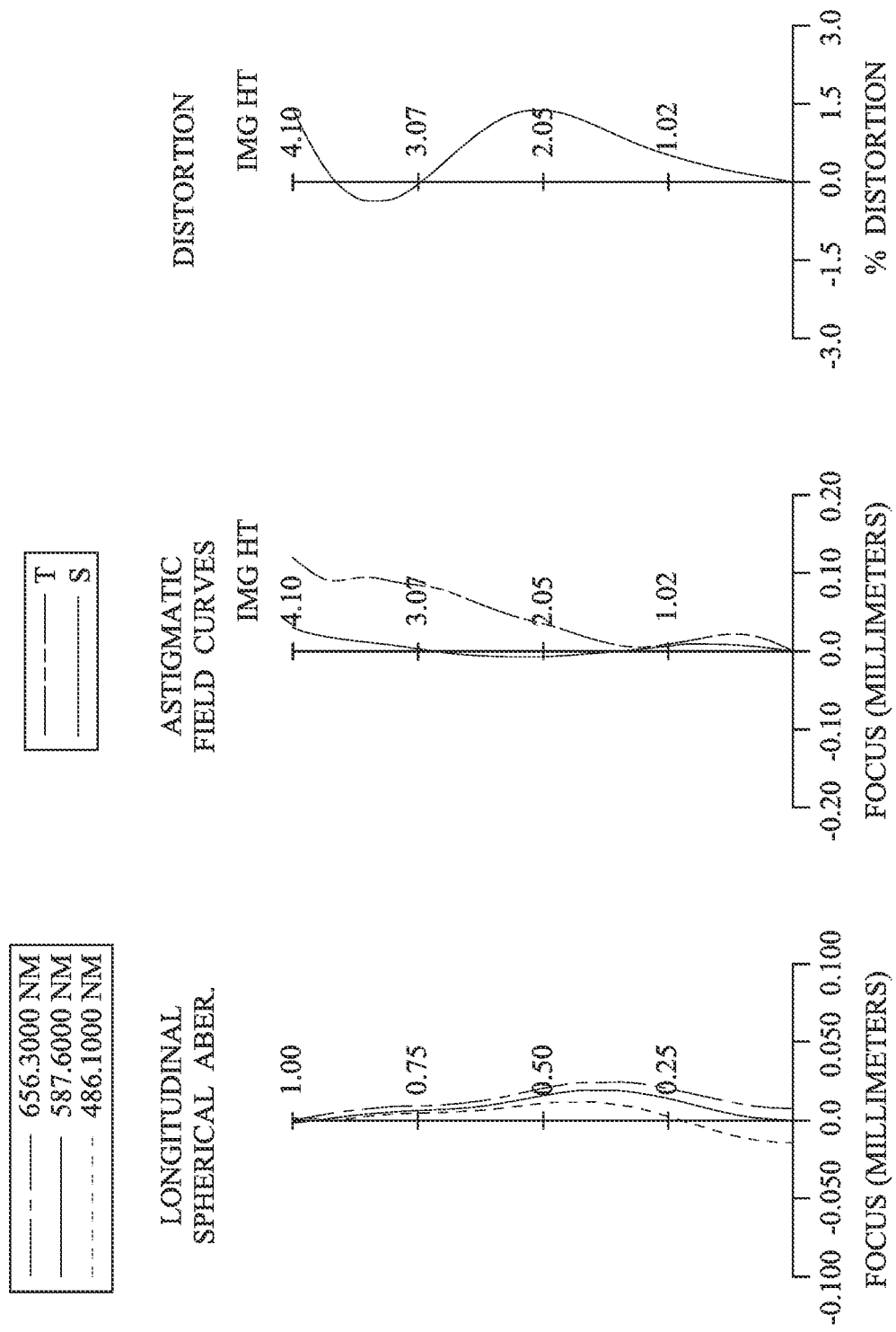
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment. In FIG. 7, the image capturing apparatus includes the optical lens assembly (its reference numeral is omitted) and an image sensor 495. The optical lens assembly includes, in order from an object side to an image side, an aperture stop 400, a first lens element 410, a second lens element 420, a third lens element 430, a fourth lens element 440, a fifth lens element 450, a sixth lens element 460, a seventh lens element 470, an IR-cut filter 480 and an image surface 490. The image sensor 495 is disposed on the image surface 490 of the optical lens assembly. The optical lens assembly has a total of seven lens elements (410-470) with refractive power. Moreover, there is an air gap on the optical axis between every two of the first lens element 410, the second lens element 420, the third lens element 430, the fourth lens element 440, the fifth lens element 450, the sixth lens element 460 and the seventh lens element 470 that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with negative refractive power has an object-side surface 471 being concave in a paraxial region thereof and an image-side surface 472 being concave in a paraxial region thereof. The seventh lens element 470 is made of plastic material and has the object-side surface 471 and the image-side surface 472 being both aspheric. Furthermore, the image-side surface 472 of the seventh lens element 470 includes at least one convex shape in an off-axial region thereof.

The IR-cut filter 480 is made of glass material and located between the seventh lens element 470 and the image surface 490, and will not affect the focal length of the optical lens assembly.

The detailed optical data of the 4th embodiment are shown in TABLE 7 and the aspheric surface data are shown in TABLE 8 below.

TABLE 7

4th Embodiment
f = 4.65 mm, Fno = 2.08, HFOV = 41.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.263 |  |  |  |  |
| 2 | Lens 1 | 2.274 | ASP | 0.522 | Plastic | 1.544 | 55.9 | 7.87 |
| 3 |  | 4.460 | ASP | 0.094 |  |  |  |  |
| 4 | Lens 2 | 11.801 | ASP | 0.270 | Plastic | 1.639 | 23.5 | −15.61 |
| 5 |  | 5.357 | ASP | 0.103 |  |  |  |  |
| 6 | Lens 3 | 2.083 | ASP | 0.334 | Plastic | 1.544 | 55.9 | 24.00 |
| 7 |  | 2.338 | ASP | 0.247 |  |  |  |  |
| 8 | Lens 4 | 7.482 | ASP | 0.555 | Plastic | 1.544 | 55.9 | 4.50 |
| 9 |  | −3.540 | ASP | 0.058 |  |  |  |  |
| 10 | Lens 5 | −11.839 | ASP | 0.300 | Plastic | 1.583 | 30.2 | −6.55 |
| 11 |  | 5.697 | ASP | 0.523 |  |  |  |  |
| 12 | Lens 6 | −40.234 | ASP | 0.854 | Plastic | 1.544 | 55.9 | 3.37 |
| 13 |  | −1.765 | ASP | 0.359 |  |  |  |  |
| 14 | Lens 7 | −17.961 | ASP | 0.600 | Plastic | 1.544 | 55.9 | −2.49 |
| 15 |  | 1.483 | ASP | 0.600 |  |  |  |  |
| 16 | IR-cut filter | Plano |  | 0.175 | Glass | 1.517 | 64.2 | — |
| 17 |  | Plano |  | 0.405 |  |  |  |  |
| 18 | Image | Plano |  | — |  |  |  |  |

Note:
Reference wavelength is 587.6 nm (d-line).

TABLE 8

Aspheric Coefficients

| Surface # | 2 | 3 | 4 | 5 | 6 | 7 | 8 |
|---|---|---|---|---|---|---|---|
| k = | −8.7323E−01 | −1.9130E+01 | 0.0000E+00 | −1.0000E+00 | −4.1435E+00 | −5.4992E−01 | 3.0000E+00 |
| A4 = | −1.1734E−02 | −1.0016E−01 | −9.1606E−02 | −1.7159E−02 | −9.7813E−03 | −4.1397E−02 | −2.0861E−02 |
| A6 = | 1.8456E−02 | 6.9928E−02 | 9.0852E−02 | 3.3351E−02 | −1.2657E−02 | 2.1559E−04 | 1.0443E−04 |

TABLE 8-continued

| Aspheric Coefficients | | | | | | | |
|---|---|---|---|---|---|---|---|
| A8 = | −1.1939E−02 | −1.7926E−02 | −3.6121E−02 | −2.5730E−02 | −1.0476E−02 | −1.1053E−02 | −1.8913E−03 |
| A10 = | −6.7191E−03 | −1.0134E−02 | −4.0290E−03 | 4.1753E−03 | 7.5336E−05 | −1.9925E−04 | −1.7405E−03 |
| A12 = | 1.3577E−02 | 1.4283E−02 | 9.3199E−03 | −2.9051E−03 | | | −2.7526E−04 |
| A14 = | −5.5323E−03 | −8.0878E−03 | −5.4479E−03 | 1.1446E−03 | | | 4.1054E−04 |

| Surface # | 9 | 10 | 11 | 12 | 13 | 14 | 15 |
|---|---|---|---|---|---|---|---|
| k = | −2.0000E+01 | 4.5399E+00 | −1.0000E+00 | −2.0000E+01 | −9.2826E+00 | −1.1322E+00 | −6.9816E+00 |
| A4 = | 2.8898E−02 | 8.4936E−02 | −9.3921E−04 | 3.1408E−02 | −4.1472E−02 | −6.3851E−02 | −3.4980E−02 |
| A6 = | −5.3809E−02 | −1.1335E−01 | −2.8576E−02 | −2.8355E−03 | 7.2284E−02 | 2.2900E−02 | 8.7373E−03 |
| A8 = | 9.7815E−02 | 6.8806E−02 | 2.0885E−02 | −1.6457E−02 | −4.7761E−02 | −9.1577E−03 | −1.8446E−03 |
| A10 = | 1.3734E−03 | −2.7897E−02 | −7.5004E−03 | 9.9850E−03 | 1.5623E−02 | 2.0775E−03 | 2.2861E−04 |
| A12 = | 1.5088E−04 | 7.9085E−03 | 1.6263E−03 | −3.0831E−03 | −2.8160E−03 | −2.1134E−04 | −1.5312E−05 |
| A14 = | 1.8887E−04 | −1.1445E−03 | −1.7572E−04 | 3.5973E−04 | 2.1718E−04 | 7.8780E−06 | 4.2238E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.65 | TL/ImgH | 1.46 |
| Fno | 2.08 | |Sag52|/CT5 | 0.50 |
| HFOV (deg.) | 41.0 | Yc32/Yc72 | 0.65 |
| tan(HFOV) | 0.87 | R11/f | −8.65 |
| V2 + V5 | 53.7 | R14/f | 0.32 |
| Sd/Td | 0.95 | (R13 + R14)/(R13 − R14) | 0.85 |
| Td/EPD | 2.16 | f/f345 | 0.55 |
| Td/ΣCT | 1.40 | f/ImgH | 1.13 |
| CT6/CT7 | 1.42 | | |

5th Embodiment

Figure 9:
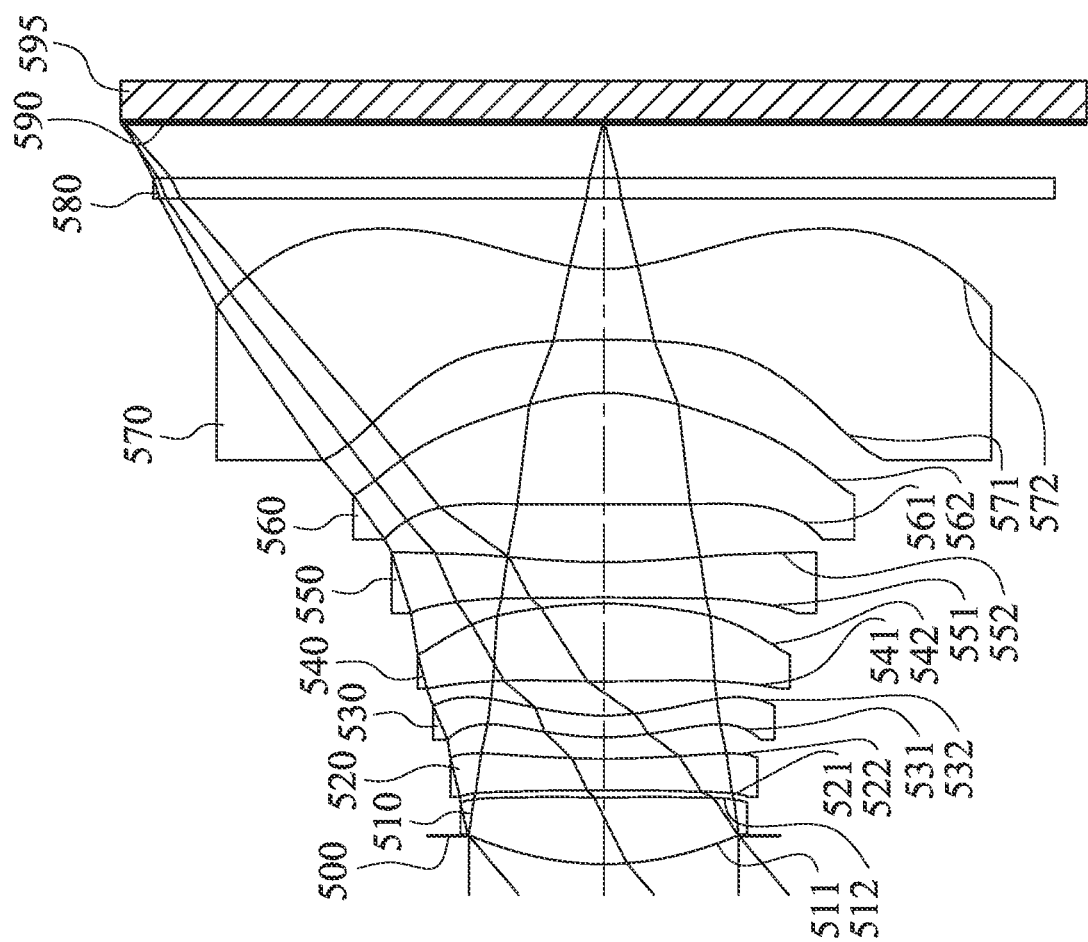
FIG. 9 is a schematic view of an image capturing apparatus according to the 5th embodiment of the present disclosure.
Figure 10:
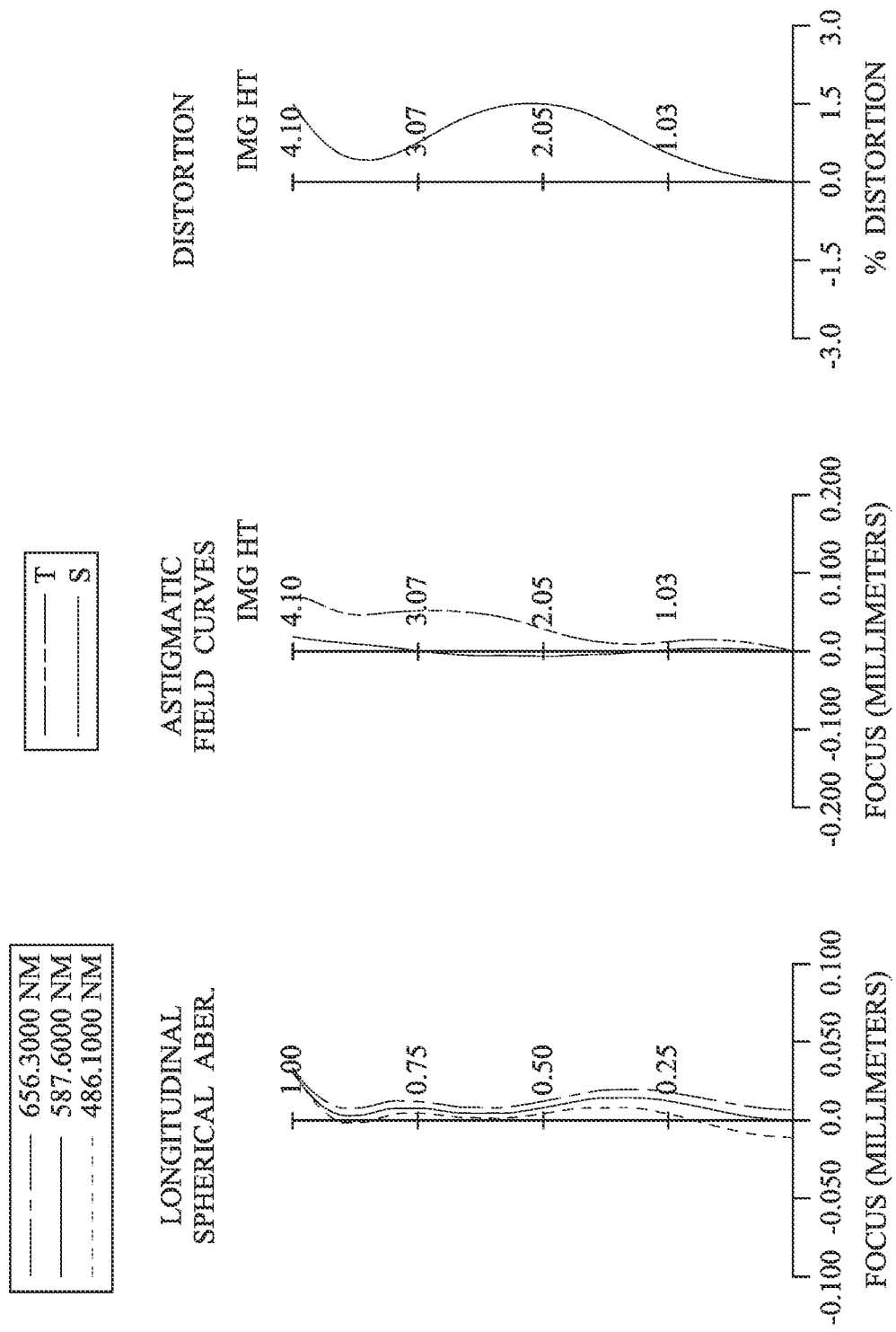
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes the optical lens assembly (its reference numeral is omitted) and an image sensor 595. The optical lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 580 and an image surface 590. The image sensor 595 is disposed on the image surface 590 of the optical lens assembly. The optical lens assembly has a total of seven lens elements (510-570) with refractive power. Moreover, there is an air gap on the optical axis between every two of the first lens element 510, the second lens element 520, the third lens element 530, the fourth lens element 540, the fifth lens element 550, the sixth lens element 560 and the seventh lens element 570 that are adjacent to each other.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric. Furthermore, the image-side surface 572 of the seventh lens element 570 includes at least one convex shape in an off-axial region thereof.

The IR-cut filter 580 is made of glass material and located between the seventh lens element 570 and the image surface 590, and will not affect the focal length of the optical lens assembly.

The detailed optical data of the 5th embodiment are shown in TABLE 9 and the aspheric surface data are shown in TABLE 10 below.

TABLE 9

5th Embodiment
f = 4.77 mm, Fno = 2.08, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.240 | | | | |
| 2 | Lens 1 | 2.640 | ASP | 0.567 | Plastic | 1.544 | 55.9 | 5.74 |
| 3 | | 15.733 | ASP | 0.058 | | | | |
| 4 | Lens 2 | 46.280 | ASP | 0.270 | Plastic | 1.608 | 25.7 | −16.18 |
| 5 | | 8.093 | ASP | 0.183 | | | | |
| 6 | Lens 3 | 2.446 | ASP | 0.185 | Plastic | 1.608 | 25.7 | −87.48 |
| 7 | | 2.271 | ASP | 0.290 | | | | |
| 8 | Lens 4 | 19.686 | ASP | 0.660 | Plastic | 1.544 | 55.9 | 5.31 |
| 9 | | −3.345 | ASP | 0.053 | | | | |
| 10 | Lens 5 | −13.940 | ASP | 0.300 | Plastic | 1.608 | 25.7 | −7.38 |
| 11 | | 6.673 | ASP | 0.492 | | | | |
| 12 | Lens 6 | −40.234 | ASP | 0.946 | Plastic | 1.544 | 55.9 | 3.32 |
| 13 | | −1.745 | ASP | 0.451 | | | | |
| 14 | Lens 7 | −10.057 | ASP | 0.600 | Plastic | 1.514 | 56.8 | −2.57 |
| 16 | | 1.550 | ASP | 0.600 | | | | |
| 16 | IR-cut filter | Plano | | 0.175 | Glass | 1.517 | 64.2 | — |
| 17 | | Plano | | 0.472 | | | | |
| 18 | Image | Plano | | — | | | | |

Note:
Reference wavelength is 587.6 nm (d-line).

TABLE 10

Aspheric Coefficients

| Surface # | 2 | 3 | 4 | 5 | 6 | 7 | 8 |
|---|---|---|---|---|---|---|---|
| k = | −4.3271E−01 | −1.0144E+01 | 0.0000E+00 | −1.0000E+00 | −6.8347E+00 | −2.2884E+00 | −1.9782E+01 |
| A4 = | −6.7360E−03 | −9.6166E−02 | −8.9886E−02 | −2.5711E−02 | −3.1998E−02 | −5.5759E−02 | −2.5055E−02 |
| A6 = | 1.1231E−02 | 7.9768E−02 | 1.0015E−01 | 2.8035E−02 | −2.0165E−02 | 1.6019E−03 | 1.1191E−03 |
| A8 = | −1.2117E−02 | −1.6616E−02 | −3.5570E−02 | −2.2133E−02 | −6.6237E−03 | −8.9913E−03 | −1.0895E−03 |
| A10 = | −4.3429E−03 | −1.5309E−02 | −4.2800E−03 | 5.5664E−03 | −1.1782E−03 | 1.7552E−03 | −2.4391E−04 |
| A12 = | 1.3157E−02 | 1.6502E−02 | 8.5799E−03 | −3.1647E−03 | | | 1.9517E−04 |
| A14 = | −5.5323E−03 | −8.0878E−03 | −5.4479E−03 | 5.8623E−04 | | | 4.3996E−05 |

| Surface # | 9 | 10 | 11 | 12 | 13 | 14 | 15 |
|---|---|---|---|---|---|---|---|
| k = | −2.0000E+01 | −1.2279E+01 | −1.0000E+00 | −7.4621E+00 | −6.1424E+00 | −1.1322E+00 | −6.0560E+00 |
| A4 = | 2.4901E−02 | 8.7468E−02 | −1.4278E−03 | 3.6249E−02 | −8.3522E−04 | −2.8848E−02 | −2.9529E−02 |
| A6 = | −5.6742E−02 | −1.1241E−01 | −3.0796E−02 | −2.1733E−02 | 1.1932E−02 | −1.3697E−02 | 4.1553E−03 |
| A8 = | 1.0915E−02 | 6.7537E−02 | 2.0747E−02 | −3.3241E−04 | −1.1756E−02 | 5.3934E−03 | −3.9542E−04 |
| A10 = | 1.4093E−03 | −2.8202E−02 | −7.4854E−03 | 1.2866E−03 | 3.3281E−03 | −9.0001E−04 | 1.6252E−05 |
| A12 = | −1.5342E−04 | 7.9735E−03 | 1.6382E−03 | −2.8909E−04 | −4.1769E−04 | 1.0536E−04 | −2.1557E−07 |
| A14 = | −7.6618E−06 | −1.0523E−03 | −1.6140E−04 | 1.9534E−05 | 2.3168E−05 | −5.9314E−06 | 2.4365E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 4.77 | TL/ImgH | 1.54 |
| Fno | 2.08 | |Sag52|/CT5 | 0.28 |
| HFOV (deg.) | 40.2 | Yc32/Yc72 | 0.61 |
| tan(HFOV) | 0.85 | R11/f | −8.43 |
| V2 + V5 | 51.4 | R14/f | 0.32 |

-continued

| 5th Embodiment | | | |
|---|---|---|---|
| Sd/Td | 0.95 | (R13 + R14)/(R13 − R14) | 0.73 |
| Td/EPD | 2.20 | f/f345 | 0.22 |
| Td/ΣCT | 1.43 | f/ImgH | 1.16 |
| CT6/CT7 | 1.58 | | |

6th Embodiment

Figure 11:
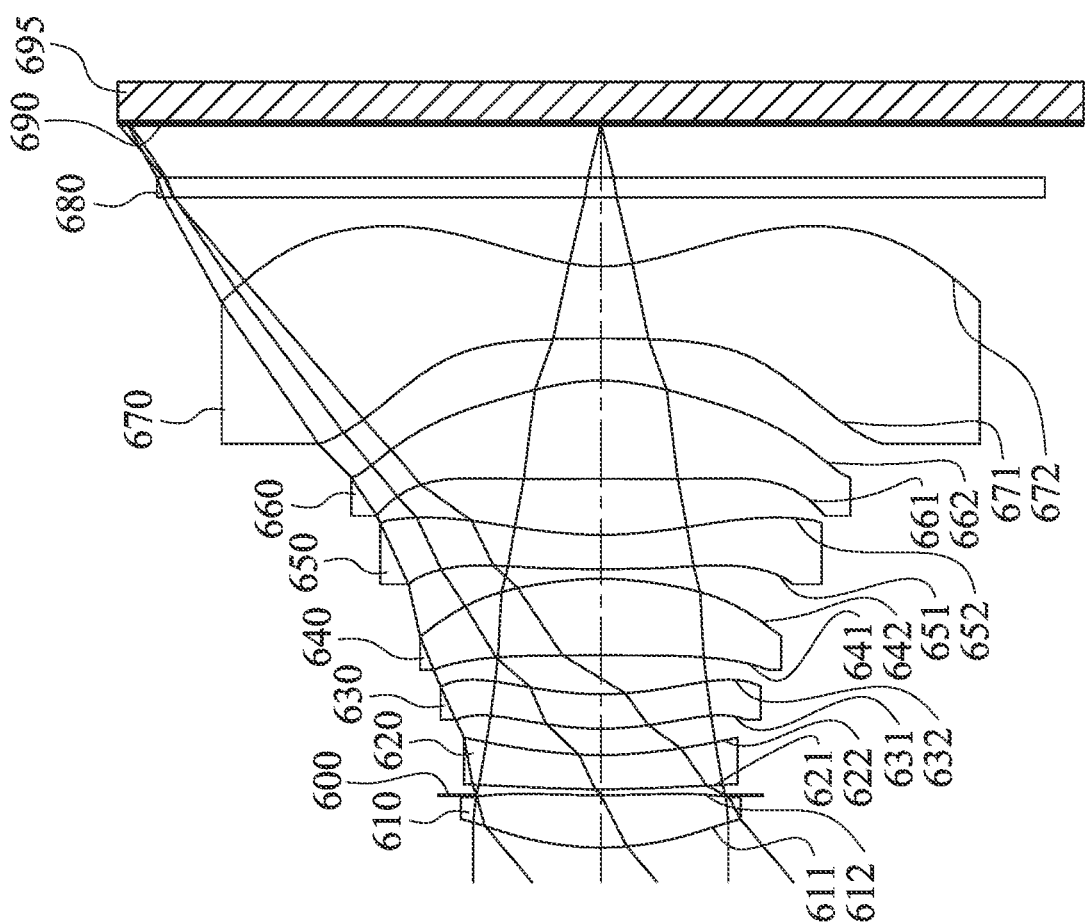
FIG. 11 is a schematic view of an image capturing apparatus according to the 6th embodiment of the present disclosure.
Figure 12:
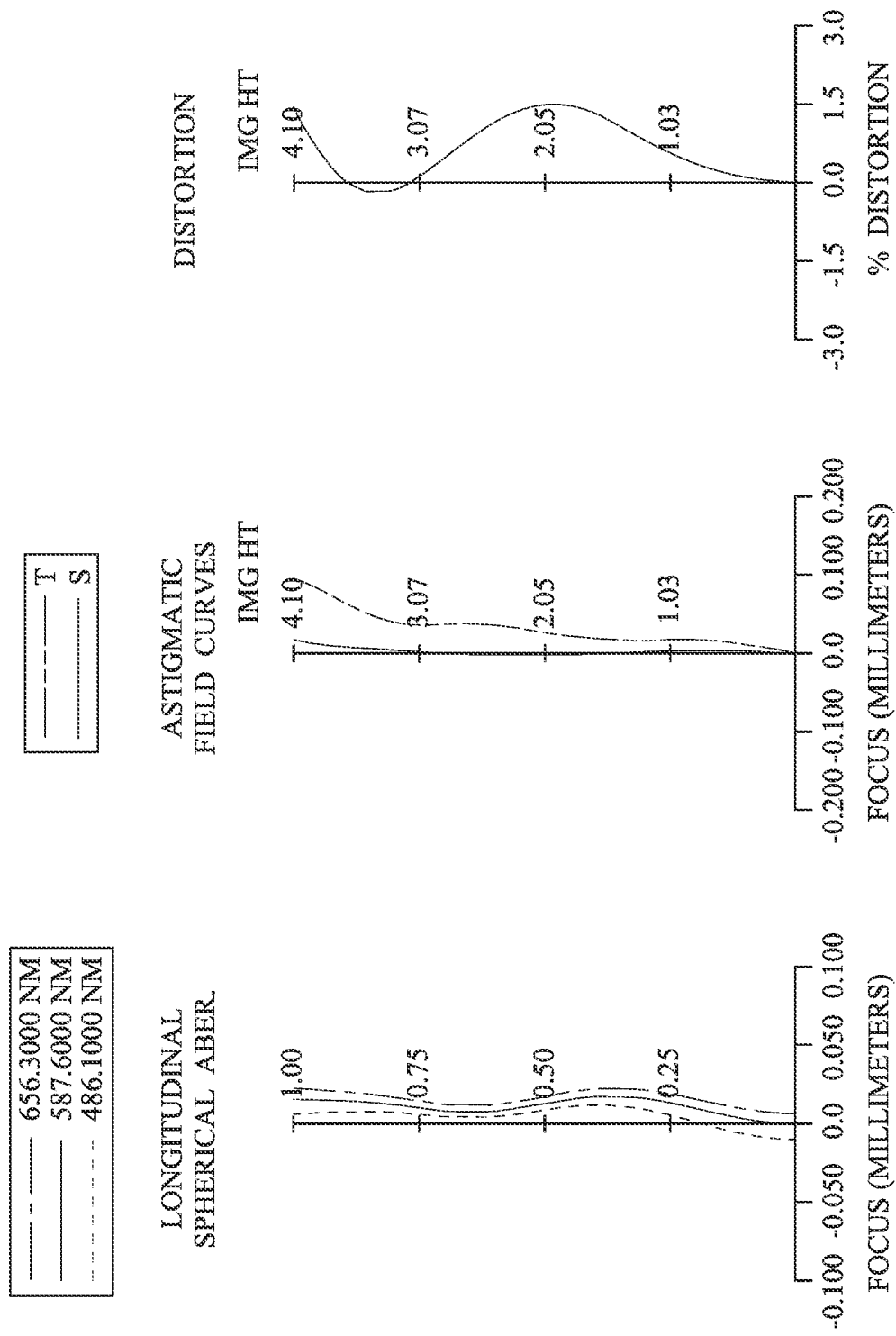
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment. In FIG. 11, the image capturing apparatus includes the optical lens assembly (its reference numeral is omitted) and an image sensor 695. The optical lens assembly includes, in order from an object side to an image side, a first lens element 610, an aperture stop 600, a second lens element 620, a third lens element 630, a fourth lens element 640, a fifth lens element 650, a sixth lens element 660, a seventh lens element 670, an IR-cut filter 680 and an image surface 690. The image sensor 695 is disposed on the image surface 690 of the optical lens assembly. The optical lens assembly has a total of seven lens elements (610-670) with refractive power. Moreover, there is an air gap on the optical axis between every two of the first lens element 610, the second lens element 620, the third lens element 630, the fourth lens element 640, the fifth lens element 650, the sixth lens element 660 and the seventh lens element 670 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with negative refractive power has an object-side surface 671 being concave in a paraxial region thereof and an image-side surface 672 being concave in a paraxial region thereof. The seventh lens element 670 is made of plastic material and has the object-side surface 671 and the image-side surface 672 being both aspheric. Furthermore, the image-side surface 672 of the seventh lens element 670 includes at least one convex shape in an off-axial region thereof.

The JR-cut filter 680 is made of glass material and located between the seventh lens element 670 and the image surface 690, and will not affect the focal length of the optical lens assembly.

The detailed optical data of the 6th embodiment are shown in TABLE 11 and the aspheric surface data are shown in TABLE 12 below.

TABLE 11

6th Embodiment
f = 4.77 mm, Fno = 2.15, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.607 | ASP | 0.456 | Plastic | 1.544 | 55.9 | 6.46 |
| 2 | | 9.345 | ASP | 0.000 | | | | |
| 3 | Ape. Stop | Plano | | 0.050 | | | | |
| 4 | Lens 2 | 6.831 | ASP | 0.300 | Plastic | 1.639 | 23.5 | −14.41 |
| 5 | | 3.871 | ASP | 0.229 | | | | |
| 6 | Lens 3 | 2.637 | ASP | 0.300 | Plastic | 1.544 | 55.9 | 44.04 |
| 7 | | 2.842 | ASP | 0.339 | | | | |
| 8 | Lens 4 | −74.312 | ASP | 0.666 | Plastic | 1.544 | 55.9 | 5.24 |
| 9 | | −2.768 | ASP | 0.084 | | | | |
| 10 | Lens 5 | 23.953 | ASP | 0.300 | Plastic | 1.608 | 25.7 | −7.78 |
| 11 | | 3.962 | ASP | 0.488 | | | | |
| 12 | Lens 6 | −20.599 | ASP | 0.855 | Plastic | 1.544 | 55.9 | 3.41 |
| 13 | | −1.732 | ASP | 0.365 | | | | |
| 14 | Lens 7 | −17.811 | ASP | 0.628 | Plastic | 1.530 | 55.8 | −2.55 |
| 15 | | 1.485 | ASP | 0.600 | | | | |
| 16 | IR-cut filter | Plano | | 0.175 | Glass | 1.519 | 64.2 | — |
| 17 | | Plano | | 0.471 | | | | |
| 18 | Image | Plano | | — | | | | |

Note:
Reference wavelength is 587.6 nm (d-line).

TABLE 12

Aspheric Coefficients

| Surface # | 1 | 2 | 4 | 5 | 6 | 7 | 8 |
|---|---|---|---|---|---|---|---|
| k = | −5.5297E−01 | −1.0144E+01 | 0.0000E+00 | −1.0000E+00 | −8.2814E+00 | −9.4280E−01 | 3.0000E+00 |
| A4 = | −7.6032E−03 | −9.6166E−02 | −8.9886E−02 | −3.3265E−02 | −1.9225E−02 | −4.6633E−02 | −1.8572E−02 |
| A6 = | 7.4994E−03 | 7.4991E−02 | 8.7448E−02 | 3.4062E−02 | −1.1578E−02 | −2.4536E−03 | 1.1814E−02 |

TABLE 12-continued

| Aspheric Coefficients | | | | | | | |
|---|---|---|---|---|---|---|---|
| A8 = | −1.0763E−02 | −2.9490E−02 | −3.9773E−02 | −2.5969E−02 | −1.0501E−02 | −7.0138E−03 | −2.4444E−02 |
| A10 = | −5.9447E−03 | −1.6013E−02 | −2.4637E−03 | 1.1977E−02 | 1.0671E−03 | 5.4507E−04 | 1.5649E−02 |
| A12 = | 1.1968E−02 | 2.1483E−02 | 1.3457E−02 | −3.1647E−03 | | | −4.3388E−02 |
| A14 = | −5.5323E−03 | −8.0878E−03 | −5.4479E−03 | −3.6061E−06 | | | 3.9678E−04 |

| Surface # | 9 | 10 | 11 | 12 | 13 | 14 | 15 |
|---|---|---|---|---|---|---|---|
| k = | −1.2675E+01 | −1.0000E+00 | −1.0000E+00 | 3.0000E+00 | −5.9448E+00 | −1.1322E+00 | −5.8392E+00 |
| A4 = | 2.4901E−02 | 8.0628E−02 | −1.4278E−03 | 5.7584E−02 | 3.0406E−02 | −1.8460E−02 | −2.9727E−02 |
| A6 = | −5.8431E−02 | −1.1321E−01 | −3.4217E−02 | −3.2215E−02 | −5.0596E−03 | −2.2846E−02 | 3.6302E−03 |
| A8 = | 1.2593E−02 | 6.6286E−02 | 2.0461E−02 | 2.7724E−02 | −1.1199E−02 | 6.8102E−03 | −2.4555E−04 |
| A10 = | 1.5606E−03 | −2.8482E−02 | −7.4740E−03 | 3.6952E−03 | 6.4952E−03 | −4.4162E−04 | −4.8613E−06 |
| A12 = | −3.3702E−04 | 8.0051E−03 | 1.6525E−03 | −1.2301E−03 | −1.0511E−03 | −3.3555E−05 | 1.3839E−06 |
| A14 = | −5.3848E−05 | −1.0142E−03 | −1.5861E−04 | 1.2432E−04 | 7.6673E−05 | 3.6617E−06 | −4.4656E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 4.77 | TL/ImgH | 1.54 |
| Fno | 2.15 | |Sag52|/CT5 | 0.34 |
| HFOV (deg.) | 40.2 | Yc32/Yc72 | 0.61 |
| tan(HFOV) | 0.85 | R11/f | −4.32 |
| V2 + V5 | 49.2 | R14/f | 0.31 |
| Sd/Td | 0.91 | (R13 + R14)/(R13 − R14) | 0.85 |
| Td/EPD | 2.28 | f/f345 | 0.42 |
| Td/ΣCT | 1.44 | f/ImgH | 1.16 |
| CT6/CT7 | 1.36 | | |

7th Embodiment

Figure 16:
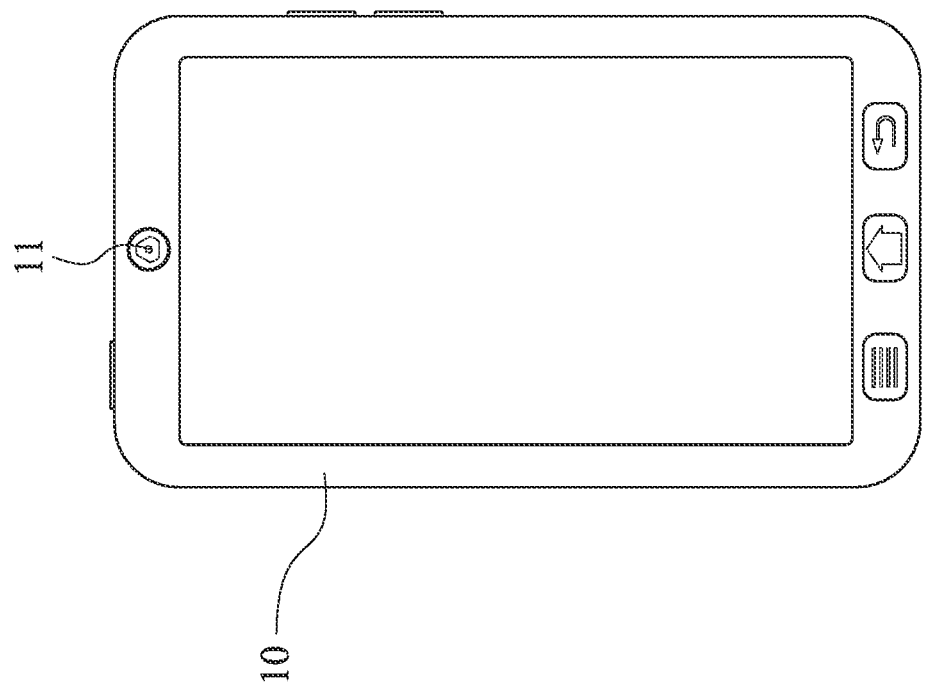
FIG. 16 shows an electronic device according to the 7th embodiment of the present disclosure.

FIG. 16 shows an electronic device 10 according to the 7th embodiment of the present disclosure. The electronic device 10 of the 7th embodiment is a smart phone, wherein the electronic device 10 includes an image capturing apparatus 11. The image capturing apparatus 11 includes an optical lens assembly (its reference numeral is omitted) according to the present disclosure and an image sensor (its reference numeral is omitted), wherein the image sensor is disposed on an image surface of the optical lens assembly.

8th Embodiment

Figure 17:
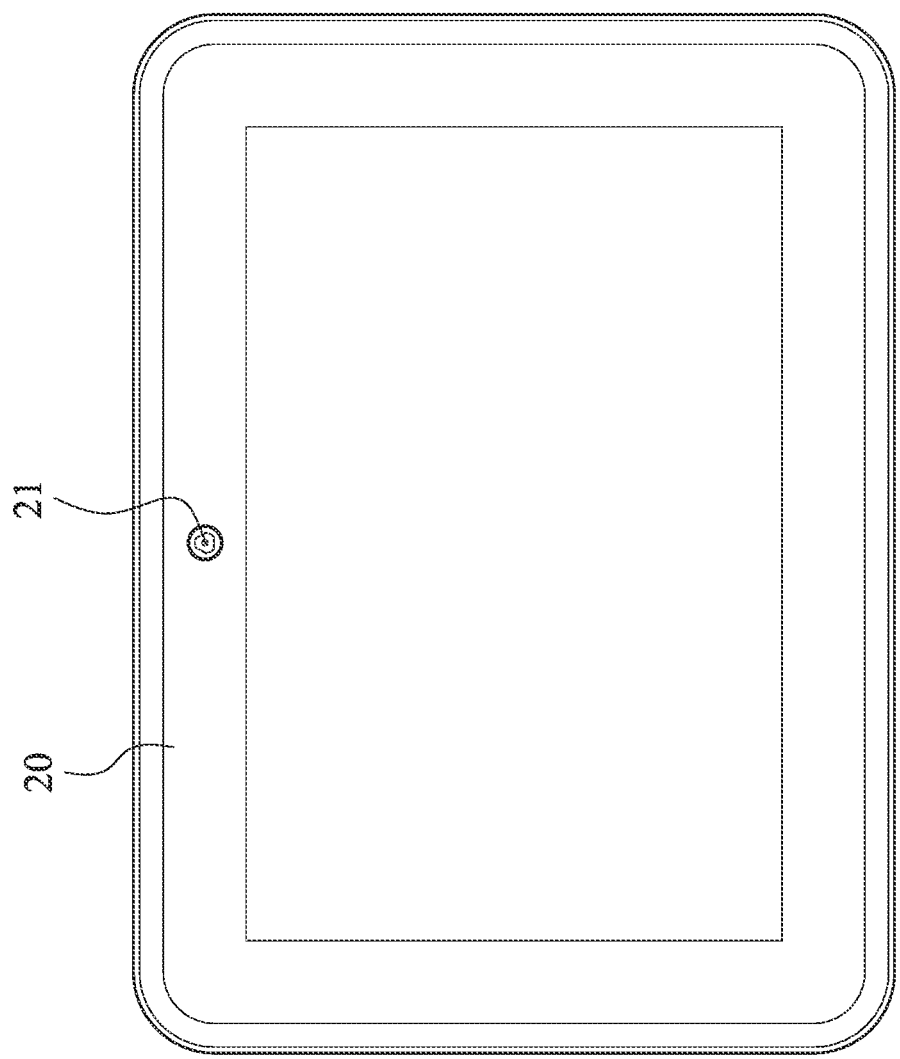
FIG. 17 shows an electronic device according to the 8th embodiment of the present disclosure.

FIG. 17 shows an electronic device 20 according to the 8th embodiment of the present disclosure. The electronic device 20 of the 8th embodiment is a tablet personal computer, wherein the electronic device 20 includes an image capturing apparatus 21. The image capturing apparatus 21 includes an optical lens assembly (its reference numeral is omitted) according to the present disclosure and an image sensor (its reference numeral is omitted), wherein the image sensor is disposed on an image surface of the optical lens assembly.

9th Embodiment

Figure 18:
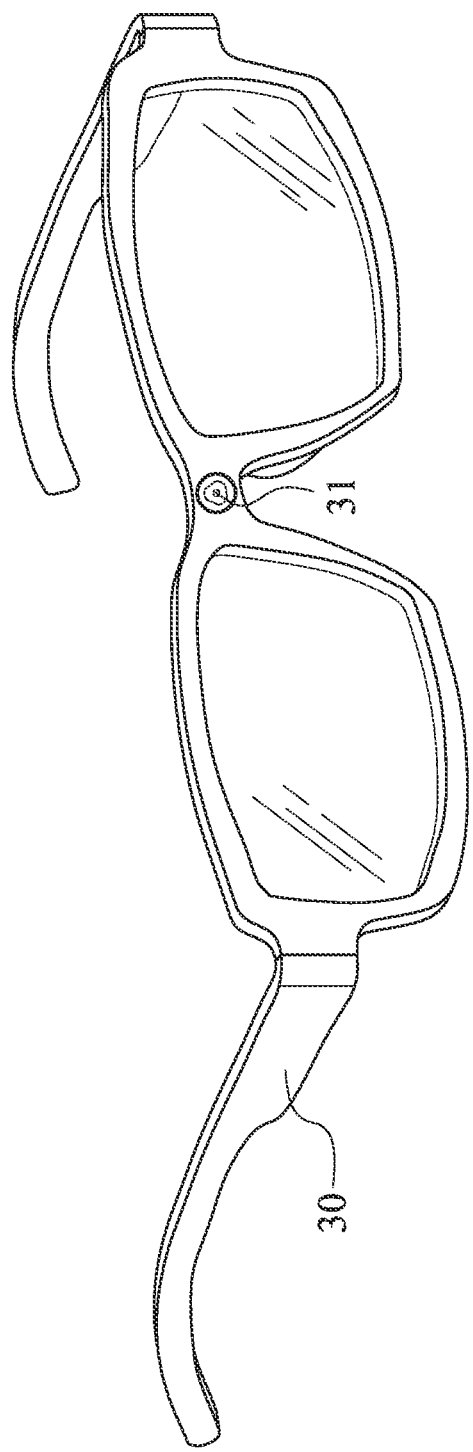
FIG. 18 shows an electronic device according to the 9th embodiment of the present disclosure.

FIG. 18 shows an electronic device 30 according to the 9th embodiment of the present disclosure. The electronic device 30 of the 9th embodiment is a head-mounted display, wherein the electronic device 30 includes an image capturing apparatus 31. The image capturing apparatus 31 includes an optical lens assembly (its reference numeral is omitted) according to the present disclosure and an image sensor (its reference numeral is omitted), wherein the image sensor is disposed on an image surface of the optical lens assembly.

The foregoing description, for purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising, in order from an object side to an image side:
   a first lens element, a second lens element, a third lens element, a fourth lens element, a fifth lens element, a sixth lens element and a seventh lens element;
   wherein the first lens element has positive refractive power; the second lens element has negative refractive power; the fourth lens element has positive refractive power; the fifth lens element has negative refractive power; the sixth lens element has positive refractive power; the seventh lens element has negative refractive power; the seventh lens element has an image-side surface being concave in a paraxial region thereof and comprising at least one convex shape in an off-axis region thereof, and an object-side surface and the image-side surface of the seventh lens element are both aspheric;
   wherein a total number of lens elements in the optical lens assembly is seven; an absolute value of a focal length of the first lens element is smaller than an absolute value of a focal length of the fifth lens element; an absolute value of a focal length of the sixth lens element is smaller than an absolute value of a focal length of the third lens element;

wherein an axial distance between an object-side surface of the first lens element and the image-side surface of the seventh lens element is Td, an entrance pupil diameter of the optical lens assembly is EPD, an axial distance between the object-side surface of the first lens element and an image surface is TL, a maximum image height of the optical lens assembly is ImgH, a curvature radius of the image-side surface of the seventh lens element is R14, a focal length of the optical lens assembly is f, and the following conditions are satisfied:

Td/EPD<3.20;
TL/ImgH≤1.54; and
0<R14/f<0.60.

2. The optical lens assembly of claim 1, wherein the first lens element has an image-side surface being concave in a paraxial region thereof.

3. The optical lens assembly of claim 1, wherein the sixth lens element has an object-side surface being concave in a paraxial region thereof; a curvature radius of the object-side surface of the sixth lens element is R11, the focal length of the optical lens assembly is f, and the following condition is satisfied:

R11/f<0.

4. The optical lens assembly of claim 1, wherein the third lens element has an image-side surface being concave in a paraxial region thereof and comprising at least one convex shape in an off-axis region thereof, and an object-side surface and the image-side surface of the third lens element are both aspheric.

5. The optical lens assembly of claim 1, wherein the axial distance between the object-side surface of the first lens element and the image-side surface of the seventh lens element is Td, a sum of central thicknesses of the first lens element, the second lens element, the third lens element, the fourth lens element, the fifth lens element, the sixth lens element and the seventh lens element is ΣCT, and the following condition is satisfied:

1.0<Td/ΣCT<1.45.

6. The optical lens assembly of claim 1, wherein the curvature radius of the image-side surface of the seventh lens element is R14, the focal length of the optical lens assembly is f, and the following condition is satisfied:

0<R14/f≤0.32.

7. The optical lens assembly of claim 1, wherein the focal length of the optical lens assembly is f, the maximum image height of the optical lens assembly is ImgH, and the following condition is satisfied:

f/ImgH≤1.16.

8. The optical lens assembly of claim 1, wherein the focal length of the optical lens assembly is f, a composite focal length of the third lens element, the fourth lens element and the fifth lens element is f345, and the following condition is satisfied:

0<f/f345≤0.42.

9. The optical lens assembly of claim 1, further comprising:

an aperture stop, wherein an axial distance between the aperture stop and the image-side surface of the seventh lens element is Sd, the axial distance between the object-side surface of the first lens element and the image-side surface of the seventh lens element is Td, and the following condition is satisfied:

0.91≤Sd/Td<1.0.

10. An image capturing apparatus, comprising:
the optical lens assembly of claim 1; and
an image sensor disposed on the image surface of the optical lens assembly.

11. An electronic device, comprising:
the image capturing apparatus of claim 10.

12. An optical lens assembly comprising, in order from an object side to an image side:

a first lens element, a second lens element, a third lens element, a fourth lens element, a fifth lens element, a sixth lens element and a seventh lens element;

wherein the first lens element has positive refractive power; the second lens element has negative refractive power; the third lens element has negative refractive power; the fourth lens element has positive refractive power; the fifth lens element has negative refractive power; the sixth lens element has positive refractive power; the seventh lens element has negative refractive power; the seventh lens element has an image-side surface being concave in a paraxial region thereof and comprising at least one convex shape in an off-axis region thereof, and an object-side surface and the image-side surface of the seventh lens element are both aspheric;

wherein the optical lens assembly further comprises an aperture stop disposed on an object side of the first lens element; a total number of lens elements in the optical lens assembly is seven;

wherein an axial distance between an object-side surface of the first lens element and the image-side surface of the seventh lens element is Td, an entrance pupil diameter of the optical lens assembly is EPD, an axial distance between the object-side surface of the first lens element and an image surface is TL, a maximum image height of the optical lens assembly is ImgH, and the following conditions are satisfied:

Td/EPD<3.20; and
TL/ImgH≤1.54.

13. The optical lens assembly of claim 12, wherein the second lens element has an object-side surface being convex in a paraxial region thereof and an image-side surface being concave in a paraxial region thereof; the third lens element has an object-side surface being convex in a paraxial region thereof and an image-side surface being concave in a paraxial region thereof.

14. The optical lens assembly of claim 12, wherein
an axial distance between the aperture stop and the image-side surface of the seventh lens element is Sd, the axial distance between the object-side surface of the first lens element and the image-side surface of the seventh lens element is Td, and the following condition is satisfied:

0.80<Sd/Td<1.0.

15. The optical lens assembly of claim 12, wherein an axial distance between the aperture stop and the image-side surface of the seventh lens element is Sd, the axial distance between the object-side surface of the first lens element and the image-side surface of the seventh lens element is Td, and the following condition is satisfied:

0.95≤Sd/Td<1.0.

16. The optical lens assembly of claim 12, wherein a focal length of the optical lens assembly is f, the maximum image height of the optical lens assembly is ImgH, and the following condition is satisfied:

f/ImgH≤1.16.

17. The optical lens assembly of claim 12, wherein an Abbe number of the second lens element is V2, an Abbe number of the fifth lens element is V5, and the following condition is satisfied:

$30 < V2+V5 < 85$.

18. The optical lens assembly of claim 12, wherein an Abbe number of the second lens element is V2, an Abbe number of the fifth lens element is V5, and the following condition is satisfied:

$30 < V2+V5 \leq 51.4$.

19. The optical lens assembly of claim 12, wherein a focal length of the optical lens assembly is f, a composite focal length of the third lens element, the fourth lens element and the fifth lens element is f345, and the following condition is satisfied:

$0 < f/f345 < 1.0$.

20. The optical lens assembly of claim 12, wherein a curvature radius of the object-side surface of the seventh lens element is R13, a curvature radius of the image-side surface of the seventh lens element is R14, and the following condition is satisfied:

$0.73 \leq (R13+R14)/(R13-R14)$.

21. The optical lens assembly of claim 12, wherein a vertical distance between a non-axial critical point closest to the image surface in an off-axis region on an image-side surface of the third lens element and an optical axis is Yc32, a vertical distance between a non-axial critical point closest to the image surface in an off-axis region on the image-side surface of the seventh lens element and the optical axis is Yc72, and the following condition is satisfied:

$0.3 < Yc32/Yc72 < 0.75$.

* * * * *